United States Patent
Nashiki et al.

(10) Patent No.: US 8,203,246 B2
(45) Date of Patent: Jun. 19, 2012

(54) FIVE-PHASE MOTOR WITH IMPROVED STATOR STRUCTURE

(75) Inventors: Masayuki Nashiki, Komaki (JP); Naoki Tanaka, Toyohashi (JP); Hiroyasu Kudo, Ichinomiya (JP)

(73) Assignee: Denso Corporation, Kariya (JP)

( * ) Notice: Subject to any disclaimer, the term of this patent is extended or adjusted under 35 U.S.C. 154(b) by 264 days.

(21) Appl. No.: 12/710,114

(22) Filed: Feb. 22, 2010

(65) Prior Publication Data

US 2010/0213782 A1 Aug. 26, 2010

(30) Foreign Application Priority Data

Feb. 20, 2009 (JP) ................................. 2009-037374

(51) Int. Cl.
*H02K 3/28* (2006.01)
(52) U.S. Cl. .......................... 310/195; 310/203; 310/179
(58) Field of Classification Search .................. 310/158, 310/179, 180, 195, 198, 203; 318/741
See application file for complete search history.

(56) References Cited

U.S. PATENT DOCUMENTS

| | | | | |
|---|---|---|---|---|
| 4,751,448 A | * | 6/1988 | Auinger | 318/773 |
| 4,912,379 A | * | 3/1990 | Matsuda et al. | 318/400.23 |
| 5,334,898 A | * | 8/1994 | Skybyk | 310/268 |
| 5,783,891 A | * | 7/1998 | Auinger et al. | 310/180 |
| 6,222,296 B1 | | 4/2001 | Sakai et al. | |
| 6,285,104 B1 | * | 9/2001 | Nashiki | 310/184 |
| 6,417,592 B2 | * | 7/2002 | Nakamura et al. | 310/184 |
| 7,009,320 B2 | * | 3/2006 | Akita et al. | 310/179 |
| 7,268,537 B2 | * | 9/2007 | Nakano et al. | 324/207.25 |
| 2001/0040416 A1 | * | 11/2001 | Nakamura et al. | 310/201 |

FOREIGN PATENT DOCUMENTS

| | | |
|---|---|---|
| JP | A-59-220061 | 12/1984 |
| JP | A-60-9356 | 1/1985 |
| JP | A-4-210744 | 7/1992 |
| JP | A-10-304608 | 11/1998 |
| JP | A-2000-324781 | 11/2000 |
| JP | A-2002-511228 | 4/2002 |
| JP | A-2003-333785 | 11/2003 |
| JP | A-2005-027371 | 1/2005 |
| JP | A-2008-125153 | 5/2008 |
| JP | A-2008-136298 | 6/2008 |
| JP | A-2008-193764 | 8/2008 |
| WO | WO 98/42063 A1 | 9/1998 |

OTHER PUBLICATIONS

Notification of Reasons for Rejection dated Dec. 2, 2010 in corresponding Japanese Patent Application No. 2009-037374 (with translation).

* cited by examiner

*Primary Examiner* — Quyen Leung
*Assistant Examiner* — Naishadh Desai
(74) *Attorney, Agent, or Firm* — Oliff & Berridge, PLC

(57) ABSTRACT

A five-phase motor includes a stator and a movable member movable relative to the stator in a preset direction. The stator includes a stator core provided with five slots within 360 electrical degrees thereof. The five slots are arranged in the preset direction at preset first pitches. The stator includes at least one set of five-phase stator windings. The five-phase stator windings are arranged in the five slots relative to each other such that each of the five-phase stator windings is wound at a preset second pitch. The second pitch substantially corresponds to two of the first pitches.

4 Claims, 22 Drawing Sheets

CIRCUMFERENTIAL DIRECTION

FIVE-PHASE MOTOR WITH IMPROVED STATOR STRUCTURE

CROSS REFERENCE TO RELATED APPLICATIONS

This application is based on Japanese Patent Application 2009-037374 filed on Feb. 20, 2009. This application claims the benefit of priority from the Japanese Patent Application, so that the descriptions of which are all incorporated herein by reference.

FIELD OF THE INVENTION

The present invention relates to five-phase motors installable in various motor vehicles, such as passenger cars and trucks, various types of industrial equipment, and various home appliances, and relates to motor systems each comprising such a five-phase motor and an inverter for driving it.

BACKGROUND OF THE INVENTION

Three-phase motors have been widely used; an example of these three-phase motors is disclosed in Japanese Patent Application Publication No. 2003-333785.

FIG. 28 is an axial cross sectional view schematically illustrating a typical structure of such a three-phase motor.

The motor illustrated in FIG. 28 is provided with an output shaft 511, a substantially annular rotor core 512, and a pair of N and S poles 517 and 518 of permanent magnets. The motor is also provided with a pair of bearings 513, a substantially annular stator core 514, and a substantially cylindrical inner hollow motor housing 516 with an opening in its axial direction.

The output shaft 511 is fixedly mounted on an inner circumference of the rotor core 512. The output shaft 511 is disposed in the opening of the motor housing 516 such that both ends thereof project from the opening, and the rotor core 512 is installed in the motor housing 516. The output shaft 511 is rotatably supported by the motor housing 516 with the bearings 513. The N and S poles 517 and 518 are, for example, mounted on the outer circumference of the rotor core 512 such that the N and S poles are alternatively arranged in the circumferential direction of the rotor core 512. The rotor core 512 and the N and S poles 517 and 518 of the permanent magnet constitute a rotor of the motor.

The stator core 514 is installed in the motor housing 516 such that its inner circumference is opposite to the outer circumference of the rotor core 512 with an air gap therebetween. Three-phase stator windings are installed in the stator core 514. Ends 515 of the three-phase stator windings are drawn out from the stator core 514. The three-phase stator windings and the stator core constitute a stator.

FIG. 29 is a lateral cross sectional view taken on line AA-AA in FIG. 28. In these FIGS. 28 and 29, a two-pole, 12-slot three-phase motor is used. In order to simply illustrate the structure of the motor, hatching of the motor is omitted in illustration in FIG. 29.

As each of the three-phase stator windings of the three-phase motor illustrated in FIGS. 28 and 29, a distributed, full pitch winding is used. In FIG. 29, the stator core 514 consists of an annular back yoke and 12 teeth projecting inwardly and circumferentially arranged at equal pitches therebetween. Spaces between circumferentially adjacent teeth provide 12 slots of the stator core 514; these spaces provide slots 563 (563a to 563l) of the stator core 514. U-, V-, and W-phase stator windings are distributedly arranged.

Specifically, a first U-phase winding 521, 528 is wound from a slot 563a to another slot 563f via one axial end of the stator core 514, and a second U-phase winding 522, 527 is wound from a slot 563l to another slot 563g through one axial end of the stator core 514. These first and second U-phase windings 521, 528 and 522, 527 are electromagnetically wound in parallel to each other.

A first V-phase winding 525, 52C is wound from a slot 563i to another slot 563b through one axial end of the stator core 514, and a second V-phase winding 526, 52B is wound from a slot 563h to another slot 563C through one axial end of the stator core 514. These first and second V-phase windings 525, 52C and 526, 52B are electromagnetically wound in parallel to each other.

A first W-phase winding 529, 524 is wound from a slot 563e to another slot 563j through one axial end of the stator core 514, and a second W-phase winding 52A, 523 is wound from a slot 563d to another slot 563K through one axial end of the stator core 514. These first and second W-phase windings 529, 524 and 52A, 523 are electromagnetically wound in parallel to each other.

FIG. 30 schematically illustrates, in enlarged scale, a part of the motor illustrated in FIG. 29; this part encloses some slots 563. Reference numeral 562 represents the teeth, and reference numeral 565 represents insulating papers as an example of insulating members inserted in corresponding slots 563.

A group of conductors in one-phase winding contained in a corresponding one slot 563 is represented in FIG. 30 by reference numeral 564. In other words, the number of conductors in one-phase winding contained in a corresponding one slot represents the number of turns of the one-phase winding through the corresponding one slot.

Three-phase inverters are normally used to apply a sinusoidal voltage as a fundamental wave to each of the three-phase windings to thereby generate a rotating field. The rotating field turns the rotor based on magnetic actions between the rotating field and the N and S poles.

However, these three-phase inverters may create the fifth and seventh harmonic voltage contents of the fundamental wave; these fifth and seventh harmonic voltage contents may cause the sixth harmonic torque contents to appear in a torque of three-phase motors to be driven.

Next, FIG. 31 schematically illustrates, as an example of five-phase motors, a two-pole, 10-slot five-phase motor. In order to simply illustrate the structure of the motor, hatching of the motor is omitted in illustration in FIG. 31.

In FIG. 31, a stator core 53D of a stator of the motor includes an annular back yoke and ten teeth projecting inwardly and circumferentially arranged at equal pitches therebetween. Spaces between circumferentially adjacent teeth provide ten slots of the stator core 53D; these spaces provide slots 530 (530a to 530j) of the stator core 53D.

The stator is made up of five-phase stator windings. As each of the five-phase stator windings, a concentrated, full pitch winding is used.

Specifically, an A-phase winding 531 and 536 is concentrically wound in a slot 530a and in a slot 530f through one axial end of the stator core 53D at a pitch of 180 electrical degrees.

A B-phase winding 533 and 538 is concentrically wound in a slot 530i and in a slot 530d though one axial end of the stator core at a pitch of 180 electrical degrees. A C-phase winding 535 and 53A is concentrically wound in a slot 530g and in a slot 530b though one axial end of the stator core at a pitch of 180 electrical degrees.

A D-phase winding 537 and 532 is concentrically wound in a slot 530e and in a slot 530j through one axial end of the stator core 53D at a pitch of 180 electrical degrees. An E-phase winding 539 and 534 is concentrically wound in a slot 530c and in a slot 530h though one axial end of the stator core at a pitch of 180 electrical degrees.

The pitch of each of the A-, B-, C-, D-, and E-phase windings corresponds to one pole pitch (180 electrical degrees) of a rotor of the motor. That is, ten slots are circumferentially disposed within an angular range of 360 electrical degrees of the stator; this angular range corresponds to two-pole pitch (one north-pole pitch or one south-pole pitch) of the rotor.

FIG. 32 schematically illustrates, as another example of five-phase motors, a four-pole, 10-slot five-phase motor. In order to simply illustrate the structure of the motor, hatching of the motor is omitted in illustration in FIG. 32.

In FIG. 32, a stator core 54B of a stator of the motor includes an annular back yoke and ten teeth projecting inwardly and circumferentially arranged at equal pitches therebetween. Spaces between circumferentially adjacent teeth provide ten slots of the stator core 54B; these spaces provide slots of the stator core 54B. The stator core 54B is made up of a plurality of magnetic steel sheets stacked in alignment.

The stator is made up of five-phase stator windings. As each of the five-phase stator windings, a concentrated, short pitch winding is used.

Specifically, a first A-phase winding 540 and 541 is concentrically wound around one tooth 54E in corresponding circumferentially adjacent slots, and a second A-phase winding 546 is concentrically wound around one tooth in corresponding circumferentially adjacent slots. The first A-phase winding 540 and 541 and the second A-phase winding 546 are connected to each other in series; these windings form an A-phase winding 551 (see FIG. 33). As illustrated in FIG. 33, the motor is designed to cause a current IA to flow through the A-phase winding 551.

A first B-phase winding 542 and 54F is concentrically wound around one tooth in corresponding circumferentially adjacent slots, and a second B-phase winding 547 is concentrically wound around one tooth in corresponding circumferentially adjacent slots. The first B-phase winding 542 and 54F and the second B-phase winding 547 are connected to each other in series; these coils form a B-phase winding 552 (see FIG. 33). As illustrated in FIG. 33, the motor is designed to cause a current IB to flow through the B-phase winding 552.

A first C-phase winding 543 is concentrically wound around one tooth in corresponding circumferentially adjacent slots, and a second C-phase winding 548 is concentrically wound around one tooth in corresponding circumferentially adjacent slots. The first C-phase winding 543 and the second C-phase winding 548 are connected to each other in series; these coils form a C-phase winding 553 (see FIG. 33). As illustrated in FIG. 33, the motor is designed to cause a current IC to flow through the C-phase winding 553.

A first D-phase winding 544 is concentrically wound around one tooth in corresponding circumferentially adjacent slots, and a second D-phase winding 549 is concentrically wound around one tooth in corresponding circumferentially adjacent slots. The first D-phase winding 544 and the second D-phase winding 549 are connected to each other in series; these coils form a D-phase winding 554 (see FIG. 33). As illustrated in FIG. 33, the motor is designed to cause a current ID to flow through the D-phase winding 554.

A first E-phase winding 545 is concentrically wound around one tooth in corresponding circumferentially adjacent slots, and a second E-phase winding 54A is concentrically wound around one tooth in corresponding circumferentially adjacent slots. The first E-phase winding 545 and the second E-phase winding 54A are connected to each other in series; these coils form an E-phase winding 555 (see FIG. 33). As illustrated in FIG. 33, the motor is designed to cause a current IE to flow through the E-phase winding 555.

These currents IA, IB, IC, ID, and IE represent five-phase currents, and these A-, B-, C-, D-, and E-phase windings 551, 552, 553, 554, and 555 constitute a stator coil. In FIG. 32, reference numeral 54C represents a pair of two opposing salient north poles of a rotor, and reference numeral 54D represents a pair of two opposing salient south poles of the rotor.

As well as the five-phase motor illustrated in FIG. 31, ten slots are circumferentially disposed within an angular range of 360 electrical degrees of the stator core 54B; this angular range corresponds to two-pole pitch (one north-pole pitch or one south-pole pitch) of the rotor.

Each of the first and second windings for each phase is concentrically wound around a corresponding one tooth. For this reason, in comparison to the structure of the five-phase motor illustrated in FIG. 31, it is possible to more easily manufacture the stator (motor), to increase the winding space factor of each phase winding, and to shorten the length of the axial end of each of the stator coils of the motor. Note that the winding space factor of one-phase winding installed in one slot represents the ratio of the total cross-sectional area of the turns in the one slot to the cross-sectional area of the one slot.

SUMMARY OF THE INVENTION

Five-phase motors, examples of which have been described in the Background of the Invention, have the number of phases greater than that of phases of conventional three-phase motors. For this reason, these five-phase motors make it possible to easily reduce the fifth and seventh harmonic voltage contents, thus easily reducing ripples included in the output torque. These features make easier to manufacture high-quality five-phase motors.

However, the inventors have discovered that there are some problems in the conventional five-phase motors illustrated in FIGS. 31 and 32.

Specifically, each of the conventional five-phase motors illustrated in FIGS. 31 and 32 has ten slots circumferentially disposed within an angular range of 360 electrical degrees of the stator; this angular range corresponds to two-pole pitch (one north-pole pitch or one south-pole pitch) of the rotor.

The configuration of the stator may make complicated the productivity of the five-phase stator windings, and longer the length of each end of each phase stator winding in the axial direction of the rotor; this end projects from the stator core in the rotor's axial direction. These factors may also make complicated the structure of the stator.

In addition, assuming that the circumferential length of the radial opening end of each slot of the stator core 54B is zero, the winding pitch a of the five-phase motor illustrated in FIG. 32 is 72 electrical degrees because five-phase stator windings 540 and 541, 54F and 542, 543, 544, and 545 are arranged within the angular range of 360 electrical degrees corresponding to two-pole pitch (one north-pole pitch or one south-pole pitch) of the rotor.

Here, winding factor is defined, in a broad sense, as a ratio of reduction in a voltage across one-phase winding. Specifically, when N basic winding elements u are connected in series to provide one-phase winding, such as U-phase winding, and a phase voltage across each basic winding element is represented as v, a U-phase voltage Vu is given by Vu=K×v×

N, where K represents the winding factor. For example, when the N is set to 100 and the v is set to 2 [V], although the phase voltage Vu should be 200 [V], but the phase voltage Vu is 180 [V], the winding factor K is 180/200=0.9. This voltage-reducing effect may appear when one-phase winding is a distributed winding, a short pitch winding, and/or a distributed, short pitch winding.

For example, let us consider one-phase voltage V across a concentrated, short pitch stator winding W1 and W3 as one-phase stator winding of a two-pole motor schematically illustrated in FIG. 34 assuming that the number of turns of the stator winding W1 and W3 is set to 1 and the winding pitch α of the stator winding W1 and W3 is set to 150 electrical degrees. The rotor of the motor illustrated in FIG. 34 is identical in structure to that of the motor illustrated in FIG. 31. In addition, it is assumed that a magnetic flux distribution on the surface of the permanent magnets is regarded as a sinusoidal distribution, one-phase voltage across the stator winding W1 is set to Vw1, and one-phase voltage across the stator winding W3 is set to Vw3.

In these assumptions, a resultant voltage V based on the voltages Vw1 and Vw3 is given by (Vw1−Vw3) illustrated in FIG. 35. That is, the composite voltage (Vw1−Vw3) is the sum of the voltage waveform Vw1 and the voltage waveform −Vw3. In addition, the phase difference PD between the voltages Vw1 and Vw3 is given by PD=180°−α° where X° represents X electrical degrees.

Thus, the amplitude of the resultant voltage V is twice the voltage Vx illustrated in FIG. 35; this amplitude is given by the following equation:

$$2 \times Vx = 2 \times \cos\{(180° - \alpha°)/2\}$$

This equation represents that the winding factor of the concentrated, short pitch stator winding W1 and W3 becomes $\cos\{(180°-\alpha°)/2\}$. Because $\cos\{(180°-\alpha°)/2\}$ can be deformed as $\sin(\alpha°/2)$, the winding factor of the concentrated, short pitch stator winding W1 and W3 can be represented by $\sin(\alpha°/2)$.

Similarly, let us consider one-phase voltage V across a concentrated, full pitch stator winding W1 and W2 as one-phase stator winding of a two-pole motor schematically illustrated in FIG. 34 assuming that the number of turns of the stator winding W1 and W2 is set to 1. Because the winding pitch α° of the full pitch stator winding W1 and W2 is set to 180°, the winding factor of the concentrated, full pitch stator winding W1 and W2 becomes $\cos\{(180°-180°)/2\}=1$.

Note that the winding factor of concentrated, full pitch or short pitch stator winding can be represented as short-pitch factor Kt because a distribution factor described hereinafter can be considered as 1.

Let us consider one-phase voltage $e_{all}$ across a distributed stator winding consisting of three windings distributedly wound in different slots and connected in series; voltages of the three windings are represented by $e_a$, $e_b$, and $e_c$ illustrated in FIG. 36. The voltages $e_a$, $e_b$, and $e_c$ are different in phase by electrical degrees A from one another.

At that time, the one-phase voltage ea is the sum of the voltages $e_a$, $e_b$, and $e_c$; this is represented by the following equation:

$$e_{all} = e_a + e_b + e_c = e_b \times (\cos A + 1 + \cos A).$$

For example, when the A is set to 30°, the one-phase voltage $e_{all}$ is represented by the following equation:

$$e_{all} = e_b \times (0.866 + 1 + 0.866) = 2.732 e_b$$

That is, the winding factor, in other words, the distribution factor Kb representing the ratio of reduction in the one-phase voltage across the distributed stator coil, is represented by the following equation:

$$Kb = 2.732/3 = 0.91$$

Thus, the winding factor of one-phase voltage across a distributed, short pitch stator winding can be represented by the product of the short pitch factor Kt and the distribution factor Kb.

Based on the definition of the winding factor, in the structure of the five-phase motor illustrated in FIG. 32, the winding factor K is calculated by the following equation:

$$K = \cos\{(180°-\alpha°)/2\} = \{(180°-72°)/2\} = 0.588$$

Because the winding factor K of the five-phase motor is proportional to the output torque to be created by the five-phase motor, the five-phase motor illustrated in FIG. 32 may reduce its output torque in comparison to motors each with the winding factor greater than 0.588.

On the other hand, as viewed from current, because a pair of different-phase windings are disposed in one slot of the five-phase motor illustrated in FIG. 32, electromagnetic actions based on a current flowing through each of the pair of different-phase windings cause the output torque. In other words, a resultant current of the currents flowing through the respective paired different-phase windings causes the output torque.

In the structure of the five-phase motor illustrated in FIG. 32, a current to flow through one of a pair of different-phase windings disposed in each slot of the stator 54B is different in phase by a predetermined electrical angle β from that to flow through the other of the pair of different-phase windings disposed therein.

Specifically, the first current flowing through one of the pair of different-phase windings disposed in one slot and the second current flowing through the other of the pair thereof disposed in the same slot have a relationship similar to the relationship between the voltages Vw1 and VW3. Thus, the current-cancelling factor between the first and second currents is given by:

$$CF = \cos(\beta°/2)$$

where CF represents the current-canceling factor between the first and second currents with the phase difference β° therebetween in comparison to that between the first and second currents with no phase difference.

For example, the A-phase winding 54I and the B-phase winding 54F are disposed in one slot, and, a current to flow in the A-phase winding 54I in a negative direction, referred to as −IA, is different in phase by 108° from a current IB to flow in the B-phase winding 54F in a positive direction, referred to as IB (see FIG. 33). The positive direction represents a direction into the paper of FIG. 32, and the negative direction represents a direction out of the paper of FIG. 32.

Thus, the amplitude of the resultant vector of the current vectors −IA and IB is 0.588 times that of the resultant vector of the current vectors −IA and Ib obtained when the phase difference between the corresponding current vectors −IA and IB is zero.

Actually, because the circumferential length of the radial opening end of each slot of the stator core 54B is not zero, the resultant vector of the current vectors disposed in each slot will be lower than 0.588 times that of the resultant vector of the current vectors disposed in each slot obtained when the phase difference between the corresponding current vectors is zero.

The more the axial width of the stator core decreases, the more the impact of the advantage of the reduction in the length of each end of each phase stator winding of the five-phase motor illustrated in FIG. 32 in the rotor's axial direction increases relative to the disadvantage of the reduction in the winding coefficient of the five-phase motor illustrated in FIG. 32.

In contrast, the more the axial width of the stator core increases, the more the impact of the disadvantage of the reduction in the winding coefficient of the five-phase motor illustrated in FIG. 32 increases relative to the impact of the advantage of the reduction in the length of each axial end of the stator coil of the five-phase motor illustrated in FIG. 32. This increase in the disadvantage may increase Joule loss in the stator coil.

Note that FIGS. 29, 31, and 32 illustrate the motors each with a surface magnet rotor, but alternative types of motors each with an interior magnet rotor, a reluctance rotor, or the like may also cause the problems set forth above.

In view of the circumstances set force above, the present invention seeks to provide five-phase motors each designed to solve at least one of the problems set forth above.

Specifically, the present invention aims at providing five-phase motors improved to have a stator whose configuration is more simplified than the configuration of the stator of a conventional five-phase motor, examples of which are illustrated in FIGS. 31 and 32.

The present invention also aims at providing five-phase motors improved to have a winding coefficient higher than that of a conventional five-phase motor, an example of which is illustrated in FIG. 32.

The present invention further aims at providing a motor system comprising such an improved five-phase motor and a driver for driving it.

According to one aspect of the present invention, there is provided a five-phase motor. The five-phase motor includes a stator; and a movable member movable relative to the stator in a preset direction. The stator includes a stator core provided with five slots within 360 electrical degrees thereof. The five slots are arranged in the preset direction at preset first pitches. The stator includes at least one set of five-phase stator windings. The five-phase stator windings are arranged in the five slots relative to each other such that each of the five-phase stator windings is wound at a preset second pitch. The second pitch substantially corresponds to two of the first pitches.

According to a first alternative aspect of the present invention, there is provided a motor system. The motor system includes the five-phase motor according to the one aspect of the present invention. Each of the five-phase stator windings of the at least one set is comprised of a combination of at least two of a plurality of first phase winding, a plurality of second phase windings, and a plurality of third phase stator windings. The motor system includes a three-phase inverter for outputting first, second, and third phase currents for creating force to move the movable member. The first phase current is supplied to the plurality of first phase winding, and the second phase current is supplied to the plurality of second phase windings. The third phase current is supplied to the plurality of third phase stator windings.

According to a second alternative aspect of the present invention, there is provided a five-phase motor. The five-phase motor includes a first rotor; a second rotor; and a stator. The stator includes a substantially annular first stator core having a first inner circumferential surface and a first outer circumferential surface; and a substantially annular second stator core having a second inner circumferential surface and a second outer circumferential surface. The first and second stator cores are coaxially arranged such that the first outer circumferential surface faces the second inner circumferential surface of the second stator core. The first rotor is coaxially arranged opposing the first inner circumferential surface of the first stator core so as to be rotatable relative to the first stator core. The second rotor is coaxially arranged opposing the second outer circumferential surface of the second stator core so as to be rotatable relative to the second stator core. The first stator core is provided with at least one first set of five slots formed in the first inner circumferential surface thereof. The at least one first set of five slots is arranged within 360 electrical degrees of the first stator core. The second stator core is provided with at least one second set of five slots formed in the second outer circumferential surface thereof. The at least one second set of the five slots is arranged within 360 electrical degrees of the second stator core. The stator includes at least one set of five-phase stator windings wound in the five slots of the at least one first set and in the five slots of the at least one second set, respectively.

According to a third alternative aspect of the present invention, there is provided a motor system. The motor system includes the five-phase motor according to the second alternative aspect of the present invention. Each of the five-phase stator windings of the at least one set is comprised of a combination of at least two of a plurality of first phase winding, a plurality of second phase windings, and a plurality of third phase stator windings. The motor system includes a three-phase inverter for outputting first, second, and third phase currents for creating force to rotate each of the first and second rotors, the first phase current being supplied to the plurality of first phase winding, the second phase current being supplied to the plurality of second phase windings, and the third phase current being supplied to the plurality of third phase stator windings.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1A:
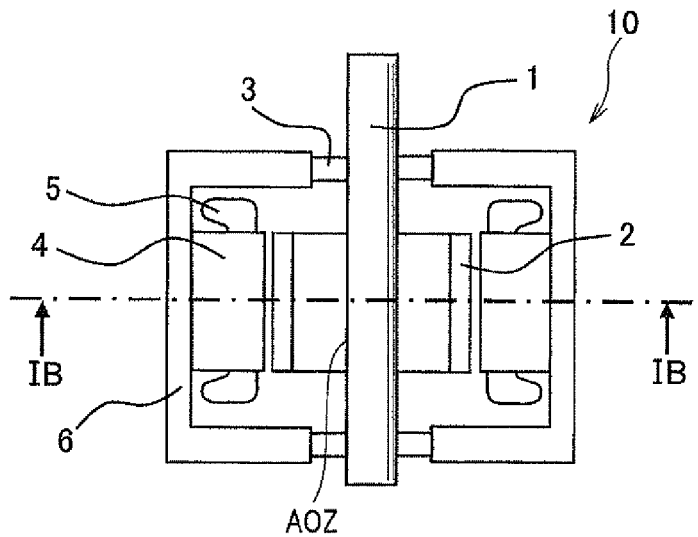
FIG. 1A is an axial cross sectional view illustrating a schematic structure of a five-phase motor according to the first embodiment of the present invention.

Embodiments of the present invention will be described hereinafter with reference to the accompanying drawings. In the drawings, identical reference characters are utilized to identify identical corresponding components.

In each embodiment, the present invention is, for example, applied to a five-phase synchronous motor (five-phase brushless motor); this synchronous motor is an example of various types of five-phase motors.

First Embodiment

Figure 1B:
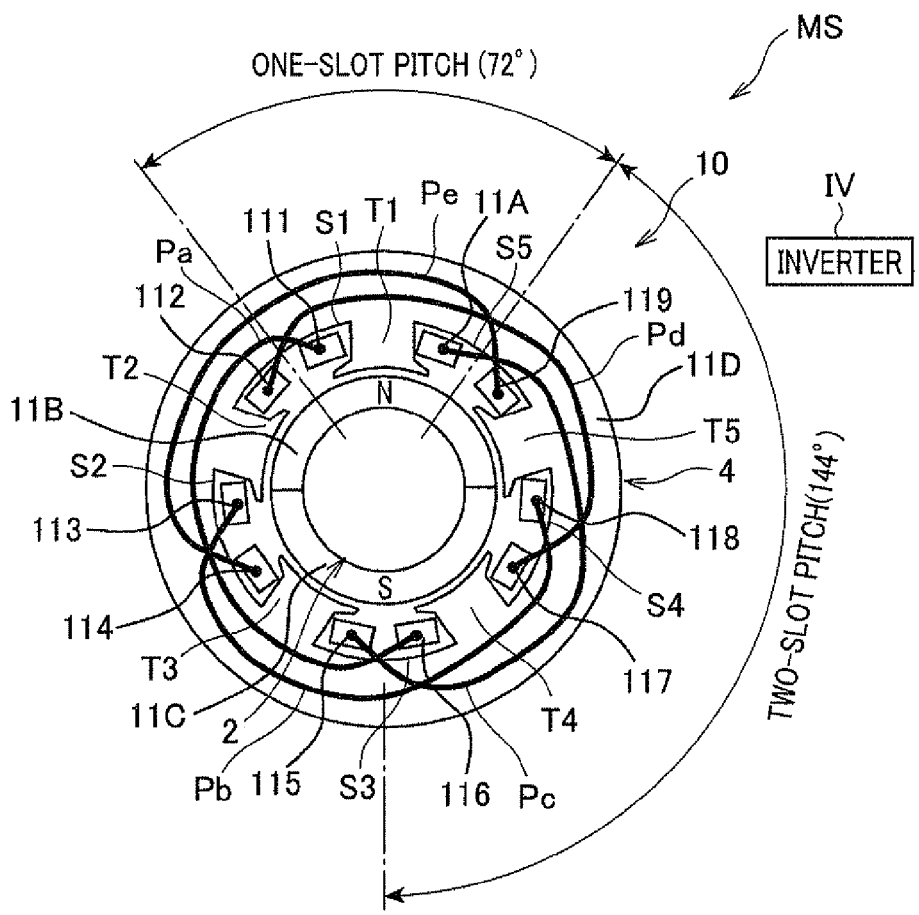
FIG. 1B is a lateral cross sectional view taken on line 1B-1B in FIG. 1A.

Referring to FIGS. 1A and 1B, there is illustrated a five-phase synchronous motor 10.

The motor 10 includes an output shaft 1 and a two salient pole rotor (movable member) 2. The motor 10 also includes a pair of bearings 3, a substantially annular stator core 4, and a substantially cylindrical inner hollow motor housing 6 with an opening in its axial direction.

The two salient pole rotor, referred to simply as "rotor", 2 has a substantially annular shape and a through hole A0Z at its center portion in its axial direction. The rotor 2 is coaxially is installed in the motor housing 6. An axis passing the center portion of the rotor 2 in the axial direction thereof will be referred to as "center axis" hereinafter.

The output shaft 1 is fixedly mounted on the inner surface of the through hole A0Z of the rotor 2. The output shaft 1 is disposed in the opening of the motor housing 6 such that both ends thereof project from the opening. The output shaft 1 is rotatably supported by the motor housing 6 with the bearings 3.

The rotor 2 is made up of, for example, a plurality of magnetic silicon steel sheets, as an example of soft magnetic materials, stacked in alignment. The rotor 2 has, at its outer circumferential surface, a pair of N and S poles 11B and 11C. The N and S poles 11B and 11C constitute the entire circumference of the rotor 2.

The stator core 4 is made up of, for example, a plurality of magnetic silicon steel sheets, as an example of soft magnetic materials, stacked in alignment. The stator core 4 is installed in the motor housing 6 such that its center axis is coaxial to the center axis of the rotor 2 and its inner circumference is opposite to the outer circumference of the rotor 2 with an air gap therebetween.

Five-phase stator windings consisting an a-phase winding 111 and 116, a b-phase winding 113 and 118, a c-phase winding 115 and 11A, a d-phase winding 117 and 112, and an e-phase winding 119 and 114 is installed in the stator core 4. The five-phase stator windings are connected to each other in, for example, star configuration to provide a stator coil. The stator coil and stator core 4 constitute a stator (stationary member).

Note that, in order to simply illustrate the structure and operations of each motor according to the embodiments of the present invention, hatching is omitted in illustration in some of the accompanying drawings.

Next, the structure of the stator will be fully described with reference to FIG. 1B.

The stator core 4 includes an annular back yoke 11D and five teeth T1, T2, T3, T4, and T5 radially inwardly projecting from the inner circumference of the back yoke 11D and circumferentially arranged at equal pitches therebetween. Each of the teeth T1 to T5 serves as a salient pole.

The inner circumferential surface of each of the teeth (salient poles) T1 to T5 has a concavely circumferentially rounded shape with a curvature identical to that of the outer surface of the N and S poles 11B and 11C of the rotor 2. Spaces between circumferentially adjacent teeth T1, T2, T3, T4, and T5 provide five slots S1, S2, S3, S4, and S5 of the stator core 4.

The five slots S1, S2, S3, S4, and S5 are arranged within 360°; the electrical angle of 360° corresponds to two-pole pitch (one north-pole pitch or one south-pole pitch) of the rotor 2. That is, a pitch between each pair of circumferentially adjacent slots in the five slots S1 to S5 is set to substantially 72° (72 electrical degrees).

The a-phase winding 111 and 116 is wound in the slots S1 and S3 at a substantially two-slot pitch corresponding to 144 electrical degrees so as to have a predetermined number of turns. Specifically, the a-phase winding 111 and 118 is wound in one circumferential end of each of the slots S1 and S3; this one end is closer to the tooth T1 than the other end is. Reference character Pa represents a winding path of each end of the a-phase winding 111 and 116 in the rotor's axial direction.

Similarly, the b-phase winding 113 and 118 is wound in the slots S2 and S4 at a substantially two-slot pitch corresponding to 144 electrical degrees so as to have a predetermined number of turns. Specifically, the b-phase winding 113 and 118 is wound in one circumferential end of each of the slots S2 and S4; this one end is closer to the tooth T2 than the other end is. Reference character Pb represents a winding path of each end of the b-phase winding 113 and 118 in the rotor's axial direction.

The c-phase winding 115 and 11A is wound in the slots S3 and S5 at a substantially two-slot pitch corresponding to 144 electrical degrees so as to have a predetermined number of turns. Specifically, the c-phase winding 115 and 11A is wound in one circumferential end of each of the slots S3 and S5, this one end is closer to the tooth T3 than the other end is. Reference character Pc represents a winding path of each end of the c-phase winding 115 and 11A in the rotor's axial direction.

The d-phase winding 117 and 112 is wound in the slots S4 and S1 at a substantially two-slot pitch corresponding to 144 electrical degrees so as to have a predetermined number of turns. Specifically, the d-phase winding 117 and 112 is wound in one circumferential end of each of the slots S4 and S1; this one end is closer to the tooth T4 than the other end is. Reference character Pd represents a winding path of each end of the d—phase winding 117 and 112 in the rotor's axial direction.

The e-phase winding 119 and 114 is wound in the slots S5 and S2 at a substantially two-slot pitch corresponding to 144 electrical degrees so as to have a predetermined number of turns. Specifically, the e-phase winding 119 and 114 is wound in one circumferential end of each of the slots S5 and S2; this one end is closer to the tooth T5 than the other end is. Reference character Pe represents a winding path of each end of the e-phase winding 119 and 114 in the rotor's axial direction.

With the structure of the five-phase motor 10, because a pair of different-phase windings are disposed in each of the slots S1, S2, S3, S4, and S5, a reluctant current of currents flowing through the paired different-phase windings disposed in each slot contributes to creating electromagnetic actions to thereby generate an output torque.

Specifically, in order to create, through the tooth T1 and the tooth T2, magnetic fluxes directed to the rotor 2, a positive a-phase current +a is required to flow through the a-phase winding 111 in a positive direction, and a negative d-phase current −d is required to flow through the d-phase winding 112 in a negative direction. The positive direction represents a direction into the paper of FIG. 1B, and the negative direction represents a direction out of the paper of FIG. 18.

Figure 2:
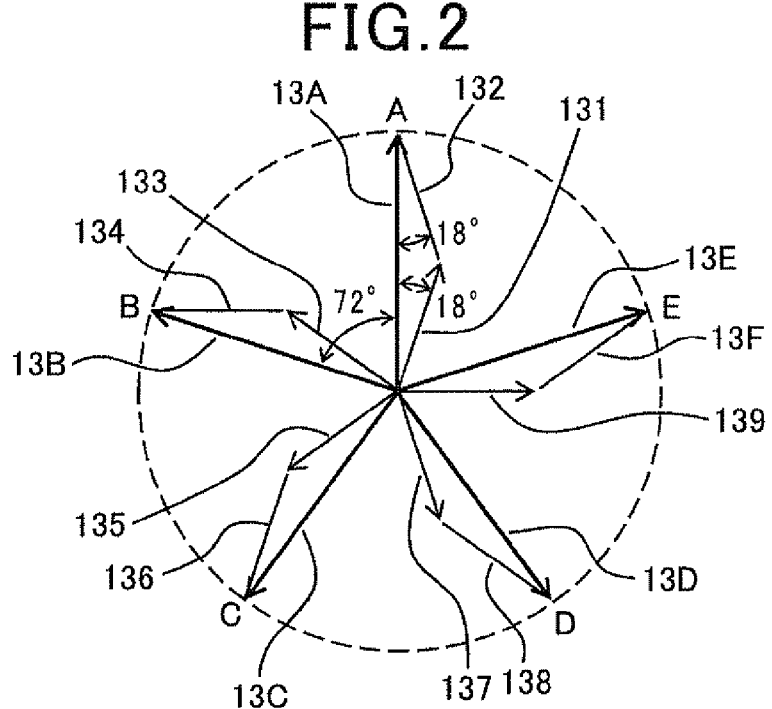
FIG. 2 is a vector diagram schematically illustrating current vectors of five-phase currents according to the first embodiment.

Reference numerals 131 and 132 illustrated in FIG. 2 represent current vectors of the positive a-phase current +a and the negative d-phase current −d, respectively. A resultant current vector 13A of the current vectors 131 and 132 represents an A-phase current vector for the slot S1.

Similarly, in order to create, through the tooth T2 and the tooth T3, magnetic fluxes directed to the rotor 2, a positive b-phase current +b is required to flow through the b-phase winding 113 in the positive direction, and a negative e-phase current −e is required to flow through the d-phase winding 114 in the negative direction.

Reference numerals 133 and 134 illustrated in FIG. 2 represent current vectors of the positive b-phase current +b and the negative e-phase current −e, respectively. A resultant current vector 13B of the current vectors 133 and 134 represents a B-phase current vector for the slot S2.

In order to create, through the tooth T3 and the tooth T4, magnetic fluxes directed to the rotor 2, a positive c-phase current +c is required to flow through the c-phase winding 115 in the positive direction, and a negative current −a is required to flow through the a-phase winding 116 in the negative direction.

Reference numerals 135 and 136 illustrated in FIG. 2 represent current vectors of the positive c-phase current +c and the negative a-phase current −a, respectively. A resultant current vector 13C of the current vectors 135 and 136 represents a C-phase current vector for the slot S3.

In order to create, through the tooth T4 and the tooth T5, magnetic fluxes directed to the rotor 2, a positive d-phase current +d is required to flow through the d-phase winding 117 in the positive direction, and a negative b-phase current −b is required to flow through the b-phase winding 118 in the negative direction.

Reference numerals 137 and 138 illustrated in FIG. 2 represent current vectors of the positive d-phase current +d and the negative b-phase current −b, respectively. A resultant current vector 13D of the current vectors 137 and 138 represents a D-phase current vector for the slot S4.

In order to create, through the tooth T5 and the tooth T1, magnetic fluxes directed to the rotor 2, a positive e-phase current +e is required to flow through the e-phase winding 119 in the positive direction, and a negative c-phase current −c is required to flow through the c-phase winding 11A in the negative direction.

Reference numerals 139 and 13F illustrated in FIG. 2 represent current vectors of the positive e-phase current +e and the negative c-phase current −c, respectively. A resultant current vector 13E of the current vectors 139 and 13F represents an E-phase current vector for the slot S5.

The arrangement of the five-phase stator windings 111 and 116, 113 and 118, 115 and 11A, 117 and 112, and 119 and 114 allows a phase difference between a pair of phase currents flowing through a pair of different-phase windings disposed in each slot to be adjusted to a lower value.

Specifically, let us consider the pair of a-phase winding 111 and d-phase winding 112.

Assuming that the positive a-phase current +a through the a-phase winding 111 has a phase of 0 electrical degrees, the phase difference between the positive d-phase current +d through the d-phase winding 117 and the positive a-phase current +a is given by 3×72°; this 3×72° is equal to 216°. Thus, the phase difference between the negative d-phase current −d through the d-phase winding 117 and the positive a-phase current +a is given by the sum of 216° and 180°; this is equal to 396° equal to the sum of 360° and 36°.

The results make clear that the phase difference between the pair of positive a-phase current +a and negative d-phase current −d flowing through the a- and d-phase windings 111 and 112 disposed in the same slot S1 is adjusted to substantially 36 electrical degrees. That is, the phase difference between a pair of phase currents flowing through a pair of different-phase windings disposed in each of the slots S1 to S5 is adjusted to substantially 36 electrical degrees.

As illustrated in FIG. 2, the phase difference between the resultant vector 13A and each of the current vectors 131 and 132 of the positive a-phase current +a and negative d-phase current −d is set to 18 electrical degrees. That is, the phase difference between each of the resultant vectors 13A to 13E and a corresponding pair of positive and negative phase current vectors is set to 18 electrical degrees.

Operations of the five-phase motor 10 according to the first embodiment will be described hereinafter.

An inverter IV for driving the five-phase motor 10 supplies A-, B-, C-, D-, and E-phase currents corresponding to the resultant vectors 13A, 13B, 13C, 13D, and 13E to the respective pairs of windings disposed in the slots S1, S2, S3, S4, and S5; these currents generate a rotating magnetic field through the respective pairs of windings, and the rotating magnetic field creates an output torque. The created output torque turns the rotor 2.

The five-phase motor 10 and the inverter IV provide a motor system MS. The five-phase motor 10 illustrated in FIGS. 1A, 1B, and 2 is configured such that the five slots S1, S2, S3, S4, and S5 are arranged within 360° corresponding to two-pole pitch of the rotor 2, and each of the five-phase stator windings is wound in a corresponding one pair of slots at a substantially two-slot pitch corresponding to 144 electrical degrees.

Figure 31:
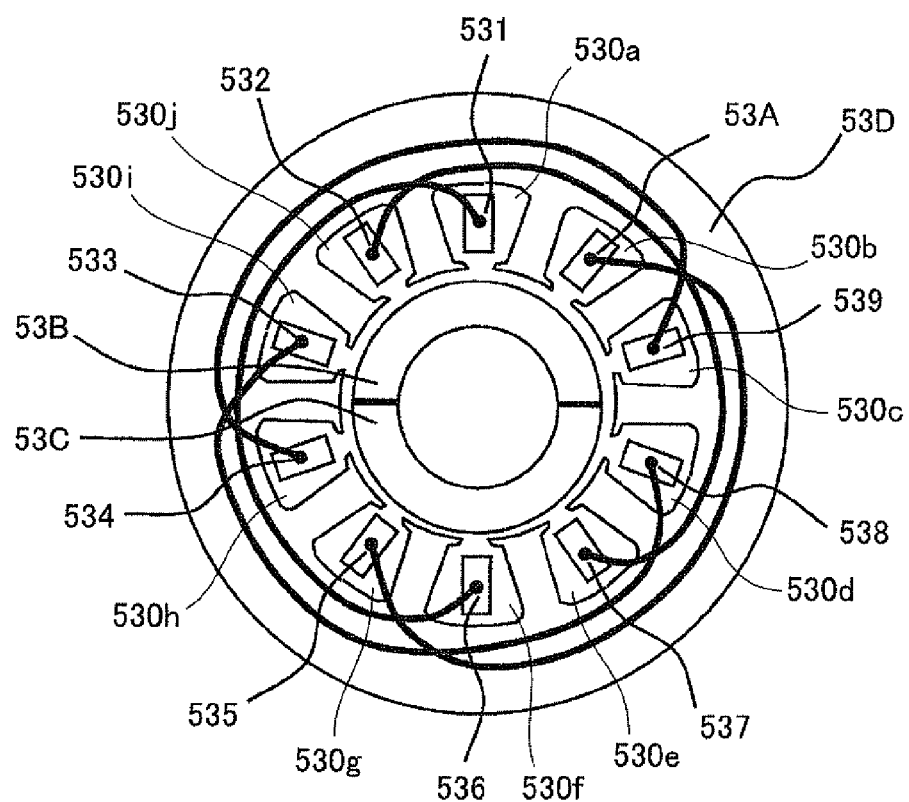
FIG. 31 is a lateral cross sectional view schematically illustrating, as an example of five-phase motors, a conventional two-pole, 10-slot five-phase motor.
Figure 32:
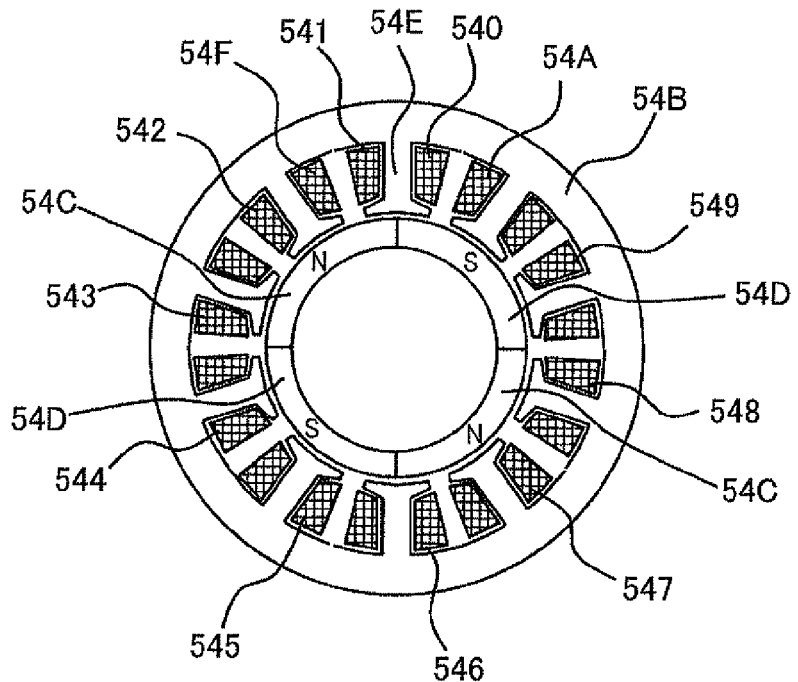
FIG. 32 is a lateral cross sectional view schematically illustrating, as an alternative example of five-phase motors, a conventional 10-slot five-phase motor.
Figure 33:
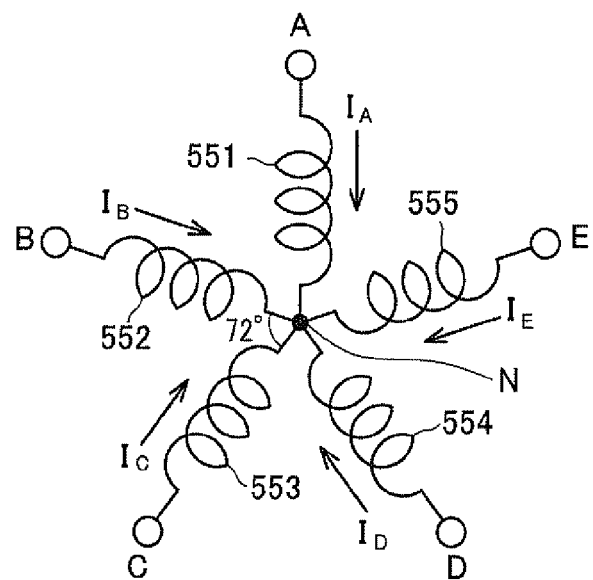
FIG. 33 is a vector diagram schematically illustrating current vectors of five-phase currents according to the first embodiment.
Figure 34:
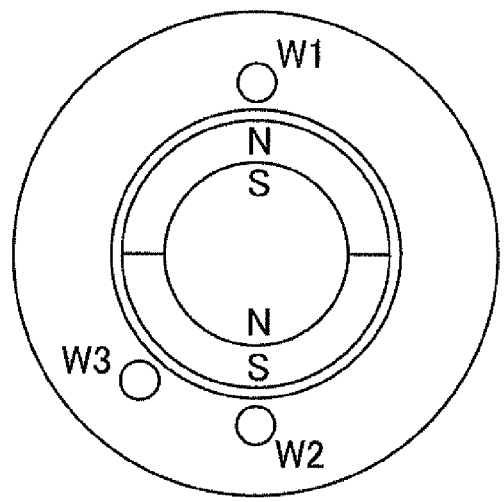
FIG. 34 is a lateral cross sectional view schematically illustrating a concentrated, short pitch stator winding.
Figure 35:
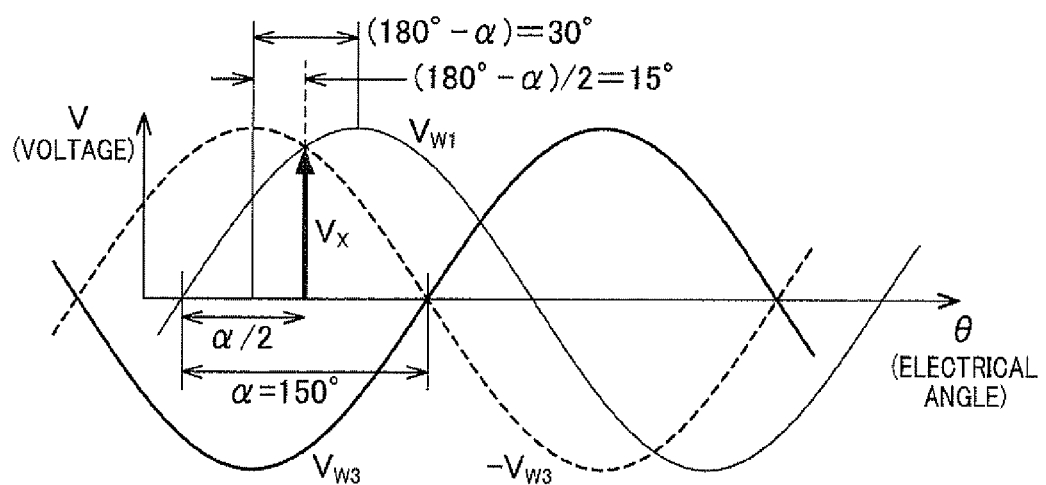
FIG. 35 is a graph schematically illustrating different phase voltage across short pitch stator windings W1 and W3 illustrated in FIG. 34, respectively.
Figure 36:
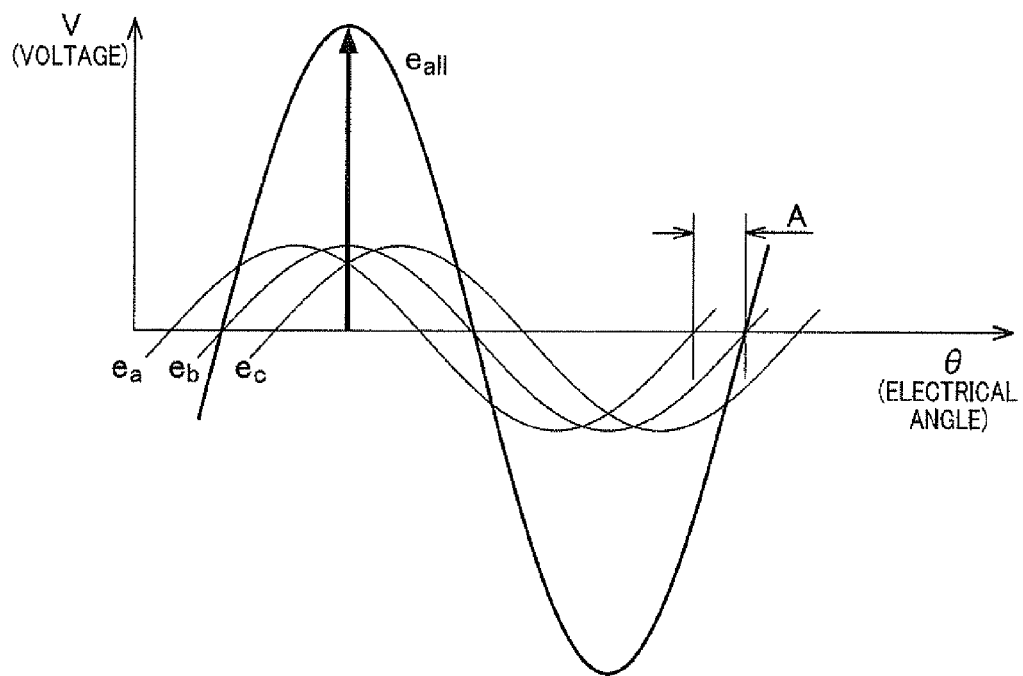
FIG. 36 is a graph schematically illustrating different phase voltage across full pitch stator windings illustrated in FIG. 34, respectively.

This configuration reduces the number of slots within 360° of the stator core 4 in comparison to the number of corresponding slots within 360° of conventional five phase motors, examples of which are illustrated in FIGS. 31 and 32. This facilitates the productivity of the five-phase stator windings, and reduces the length of each end of each phase stator winding in the rotor's axial direction, thus simplifying the structure of the stator. This facilitation and simplification makes it possible to easily manufacture the five-phase motors 10 in comparison to these conventional five-phase motors.

The configuration of the five-phase motor 10 makes it possible to set the phase difference between a pair of current vectors flowing through a pair of different-phase windings disposed in each slot to a sufficiently lower value of 36 electrical degrees. Because the phase difference PD=36°, this set determines the winding factor K of the five-phase motor 10 in accordance with the following equation:

$$K=\cos(36°/2)=0.951$$

The winding factor 0.951 of the five-phase motor 10 is a sufficient high level in practice, and is higher than the winding factor of the five-phase motor illustrated in FIG. 32. Therefore, it is possible to maintain the magnitude of the output torque to be created by the motor 10 at a high level in comparison to the five-phase motor illustrated in FIG. 32.

The maintenance, at the sufficient high level, of the winding factor of the five-phase motor 10 keeps the current-canceling factor of the five-phase motor 10 at a sufficient high level. This prevents Joule loss in the stator windings from being increased due to the level of the current-cancelling factor even if the axial width of the stator core 4 increases. This benefit also maintains, at a high level, the effective drive of the five-phase motor 10 by the inverter IV.

Note that FIG. 1B illustrates an example of two-pole, five-phase motors for the sake of describing its operations, but multi-pole, five-phase motors can be used as an example of five-phase synchronous motors according to the first embodiment.

Figure 3:
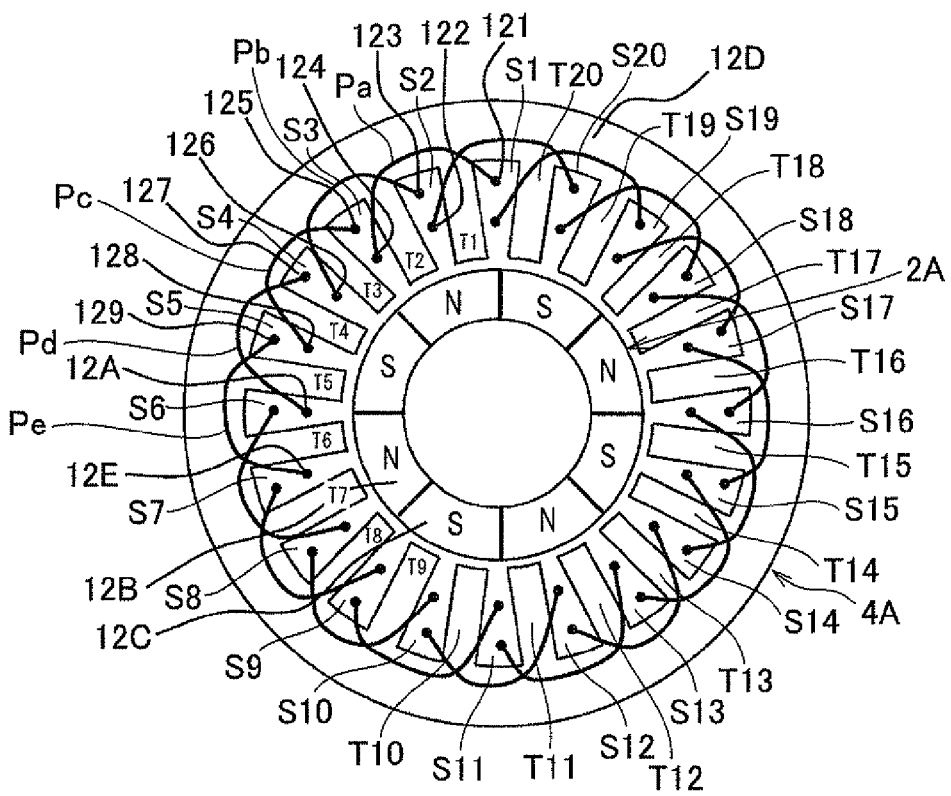
FIG. 3 is a lateral cross sectional view of an eight pole, five-phase motor according to a modification of the five-phase motor illustrated in FIGS. 1A and 1B.

FIG. 3 schematically illustrates an example of eight-pole, five-phase motors. The eight-pole, five-phase motor 10A illustrated in FIG. 3 includes a rotor 2A and a stator core 4A. The rotor 2A has, at its outer circumferential surface, four pairs of N and S poles 12B and 12C. The four pairs of N and S poles 12B and 12C constitute the entire circumference of the rotor 2A. The N and S poles 12B and 12C are circumferentially arranged alternately at regular pitches.

The stator core 4A includes an annular back yoke 12D and twenty teeth T1 to T20 radially inwardly projecting from the inner circumference of the back yoke 12D and circumferentially arranged at equal pitches therebetween. Each of the teeth T1 to T20 serves as a salient pole. The inner circumferential surface of each of the teeth (salient poles) T1 to T20 has a concavely circumferentially rounded shape with a curvature identical to that of the outer surface of the N and S poles 1213 and 12C of the rotor 2A. Spaces between circumferentially adjacent teeth T1 to T20 provide twenty slots S1 to S20 of the stator core 4A.

Circumferentially continuous five slots in the twenty slots S1 to S20 are arranged within 360°; the electrical angle of 360° corresponds to two-pole pitch (one north-pole pitch or one south-pole pitch) of the rotor 2A. That is, a pitch between each pair of circumferentially continuous five slots in the twenty slots S1 to S20 is set to substantially 72° (72 electrical degrees).

Specifically, assuming that the number (8) of the poles of the rotor 2A is set to N (N is an even number equal to or greater than 2), a total number (20) of the slots S1 to S20 is set to the product of 5/2 and the number N (8).

Four a-phase windings, four b-phase windings, four c-phase windings, four d-phase windings, and four e-phase windings are installed in the stator core 4A. One of the four a-phase windings is illustrated as an a-phase winding 121 and 124, one of the four b-phase windings is illustrated as a b-phase winding 123 and 126, and one of the four c-phase windings is illustrated as a c-phase winding 125 and 128. Similarly, one of the four d-phase windings is illustrated as a d-phase winding 127 and 12A, and one of the four e-phase windings is illustrated as an e-phase winding 129 and 12E.

The a-phase winding 121 and 124 is wound in the slot S1 and in the slot S3 at a substantially two-slot pitch corresponding to 144 electrical degrees so as to have a predetermined number of turns. Reference character Pa represents a winding path of each end of the a-phase winding 121 and 124 in the rotor's axial direction.

Similarly, the b-phase winding 123 and 126 is wound in the slot S2 and in the slot S4 at a substantially two-slot pitch corresponding to 144 electrical degrees so as to have a predetermined number of turns. Reference character Pb represents a winding path of each end of the b-phase winding 123 and 126 in the rotor's axial direction.

The c-phase winding 125 and 128 is wound in the slot S3 and in the slot S5 at a substantially two-slot pitch corresponding to 144 electrical degrees so as to have a predetermined number of turns. Reference character Pc represents a winding path of each end of the c-phase winding 125 and 128 in the rotor's axial direction.

The d-phase winding 127 and 12A is wound in the slot S4 and in the slot S6 at a substantially two-slot pitch corresponding to 144 electrical degrees so as to have a predetermined number of turns. Reference character Pd represents a winding path of each end of the d-phase winding 127 and 12A in the rotor's axial direction.

The e-phase winding 129 and 12E is wound in the slot S5 and in the slot S7 at a substantially two-slot pitch corresponding to 144 electrical degrees so as to have a predetermined number of turns. Reference character Pe represents a winding path of each end of the e-phase winding 129 and 12E in the rotor's axial direction.

That is, the four pairs of a-, b-, c-, d-, and e-phase windings are so wound in the corresponding slots of the stator core 4A as to be circumferentially aligned.

Operations and electromagnetically actions of the eight-pole, five-phase motor 10A are substantially identical to those of the eight-pole, five-phase motor 10A, and therefore, they are omitted in description.

Next, the relationship between harmonic voltage components in the input of three-phase motors and torque ripples in the output thereof will be described hereinafter.

Figure 4:
FIG. 4 is a graph schematically illustrating a relationship between harmonic voltage components in the input of three-phase motors and torque ripples in the output thereof.

FIG. 4 shows a graph whose horizontal axis represents the orders of harmonic voltage components in the input of a typical three-phase motor and whose vertical axis represents the impact factors for torque ripples in the output thereof with respect to the orders of harmonic voltage components. Note that a sinusoidal current with no lower-order current components was used to be supplied to each of the three-phase stator windings in order to obtain the characteristics illustrated in the graph in FIG. 4.

Here, as a simple example, let us consider that n-th harmonic voltage components are superimposed in the input of the three-phase motor.

At that time, U-phase input power Pu is given by the following equations [801] and [802]:

$$Pu = Vo \cdot [\sin\theta re + kn \cdot \sin(n \cdot \theta re)] \times Io \cdot \sin\theta re \quad [801]$$
$$= Vo \cdot Io \cdot [(\sin\theta re)^2 + kn \cdot \sin(n \cdot \theta re) \cdot \sin\theta re]$$
$$= Vo \cdot Io \cdot [(\sin\theta re)^2 + kn \cdot (-1/2) \cdot \{\cos(n \cdot \theta re + \theta re) - \cos(n \cdot \theta re - \theta re)\}] \quad [802]$$
$$= Vo \cdot Io \cdot [(\sin\theta re)^2 - kn/2 \cdot \{\cos((n+1) \cdot \theta re) - \cos((n-1)\theta re)\}]$$

where Vo represents the amplitude of each phase voltage, Io represents the amplitude of each phase current, θre represents the rotational angle of the rotor in electric degrees, and kn represents the ratio of the n-th harmonic voltage components to the fundamental-harmonic voltage amplitude.

Similarly, V-phase input power Pv and W-phase input power Pw are given by the following equations:

$$Pv = Vo \cdot [\sin(\theta re - 120°) + k \cdot \sin(n \cdot (\theta re - 120°))] \times Io \cdot \sin(\theta re - 120°)$$

$$Pw = Vo \cdot [\sin(\theta re - 240°) + kn \cdot \sin(n \cdot (\theta re - 240°))] \times Io \cdot \sin(\theta re - 240°)$$

Thus, input power Pi as the sum of the U-phase input power Pu, the V-phase input power Pu, and the W-phase input power Pw are given by the following equations [803], [804], and [805]:

$$Pi = Pu + Pv + Pw \quad [803]$$
$$= Vo \cdot [\sin\theta re + kn \cdot \sin(n \cdot \theta re)] \times Io \cdot \sin\theta re +$$
$$Vo \cdot [\sin(\theta re - 120°) + kn \cdot \sin(n \cdot (\theta re - 120°))] \times$$
$$Io \cdot \sin(\theta re - 120°) + Vo \cdot [\sin(\theta re - 240°) + kn \cdot$$
$$\sin(n \cdot (\theta re - 240°))] \times Io \cdot \sin(\theta re - 240°)$$
$$\cos\{(n-) \cdot (\theta re - 240°)\}]$$

$$= Vo \cdot Io \cdot [(\sin\theta re)^2 - kn/2 \cdot \{\cos((n+1) \cdot \theta re) - \quad [804]$$
$$\cos((n-1)\theta re)\}] + Vo \cdot Io \cdot [(\sin(\theta re - 120°))^2 - kn/2 \cdot$$
$$\{\cos((n+1) \cdot (\theta re - 120°)) - \cos((n-1) \cdot$$
$$(\theta re - 120°))\}] + Vo \cdot Io \cdot [(\sin(\theta re - 240°))^2 - kn/2 \cdot$$
$$\{\cos((n+1) \cdot (\theta re - 240°)) - \cos((n-1) \cdot (\theta re - 240°))\}]$$

$$= 3/2 \cdot Vo \cdot Io - Vo \cdot Io \cdot kn/2 \cdot [\cos\{(n+1) \cdot \theta re\} + \quad [805]$$
$$\cos\{(n+1) \cdot (\theta re - 120°)\} + \cos\{(n+1) \cdot (\theta re - 240°)\}] +$$
$$Vo \cdot Io \cdot kn/2 \cdot [\cos\{(n-1) \cdot \theta re\} + \cos\{(n-1) \cdot$$
$$(\theta re - 120°)\} + \cos\{(n-) \cdot (\theta re - 240°)\}]$$

Figure 5:
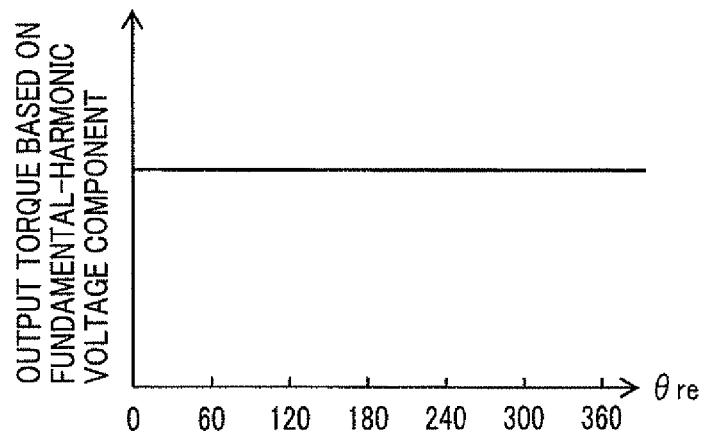
FIG. 5 is a graph schematically illustrating an output torque created by fundamental-harmonic voltage components inputted to a three-phase motor.

In FIG. 4, the first order of the harmonic voltage components represents the fundamental-harmonic voltage components. When the input of the three-phase motor consists of only the fundamental-harmonic voltage components, kn is zero so that the input power Pi [W] is the first term of the equation [803]; this first term is represented by a constant value of 3/2·Vo·Ib. Thus, the output torque T of the three-phase motor is a constant value containing no torque ripples (see FIG. 5), Note that the horizontal axis of the graph illustrated in FIG. 5 represents the rotational angle θre [°] of the rotor. If the internal loss of the three-phase motor is considered as zero, the input power Pi [W] is proportional to the output torque T [Nm] as represented by the following equation [806]:

$$Pi = T \times \omega rm \quad [806]$$

where ωrm represents an angular velocity of the rotor in radians.

The harmonic components in the input power Pi is the second term and above in the equation [805], and they have different characteristics according to their orders n. The harmonic components are qualitatively calculated as the product of the n-th harmonic voltage components and the sinusoidal current function. In accordance with the sum and differential formulas of the trigonometric functions, the (n+1)-th components and the (n−1)-th components appear as the harmonic components in the input power Pi.

The following is values of the harmonic voltage components in the input of the typical three-phase motor achieved by calculating the expression [803] using spread sheet software assuming that the magnitudes of the harmonic components are determined based on the ratio kn being set to 0.25.

Figure 6:
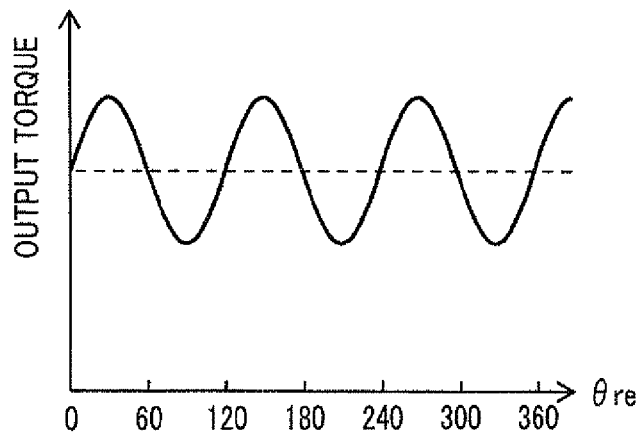
FIG. 6 is a graph schematically illustrating an output torque created by second and fourth harmonic voltage components inputted to the three-phase motor.

The second and fourth harmonic voltage components illustrated in FIG. 4 generate the characteristics of the output torque T containing the third harmonic components; the curve of the output-torque characteristics is illustrated in FIG. 6. Specifically, the output torque T contains the third torque ripples. However, because the magnetic poles of a normal rotor are circumferentially symmetrically arranged, even-ordered harmonic voltage components contained in the input of normal three-phase motors are low in magnitude.

When the three-phase windings of normal three-phase motors are connected to each other in star configuration, the third, sixth, and ninth harmonic voltage components illustrated in FIG. 4 can be cancelled between any two-phase voltages in the three-phase voltages as the input of the normal three-phase motors. Thus, the third torque ripples little appear in the output of the not three-phase motors.

Figure 7:
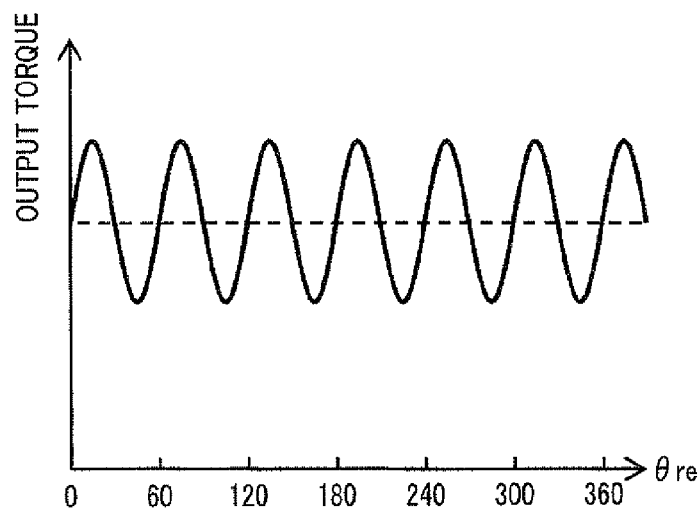
FIG. 7 is a graph schematically illustrating an output torque created by fifth and seventh harmonic voltage components inputted to the three-phase motor.

The fifth and seventh harmonic voltage components illustrated in FIG. 4 generate the characteristics of the output torque T containing the sixth harmonic components; the curve of the output-torque characteristics is illustrated in FIG. 7. Specifically, the output torque T contains the typical sixth torque ripples in normal three-phase motors. In three-phase motors, in order to reduce such torque ripples, the shapes of the magnetic poles of the rotor and those of the magnetic poles of the stator have been improved actively.

The eighth and tenth harmonic voltage components illustrated in FIG. 4 generate the characteristics of the output torque T containing the ninth harmonic components. Specifically, the output torque T contains the ninth torque ripples. However, as described above, because even-ordered harmonic voltage components contained in the input of normal three-phase motors are low in magnitude, even-ordered torque ripples are low in magnitude.

Figure 8:
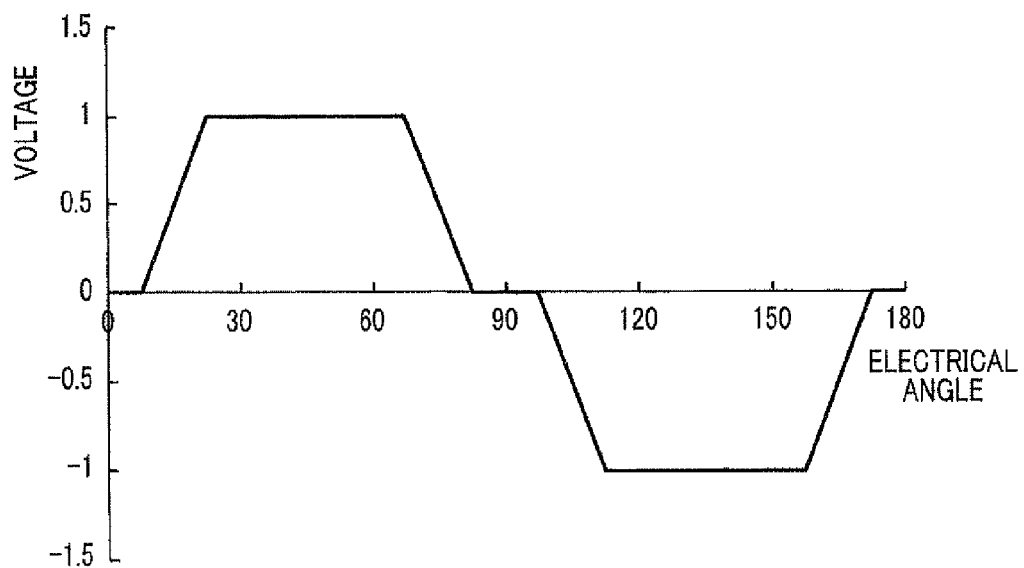
FIG. 8 is a graph schematically illustrating the waveform of a trapezoidal input voltage for normal three-phase motors.
Figure 9:
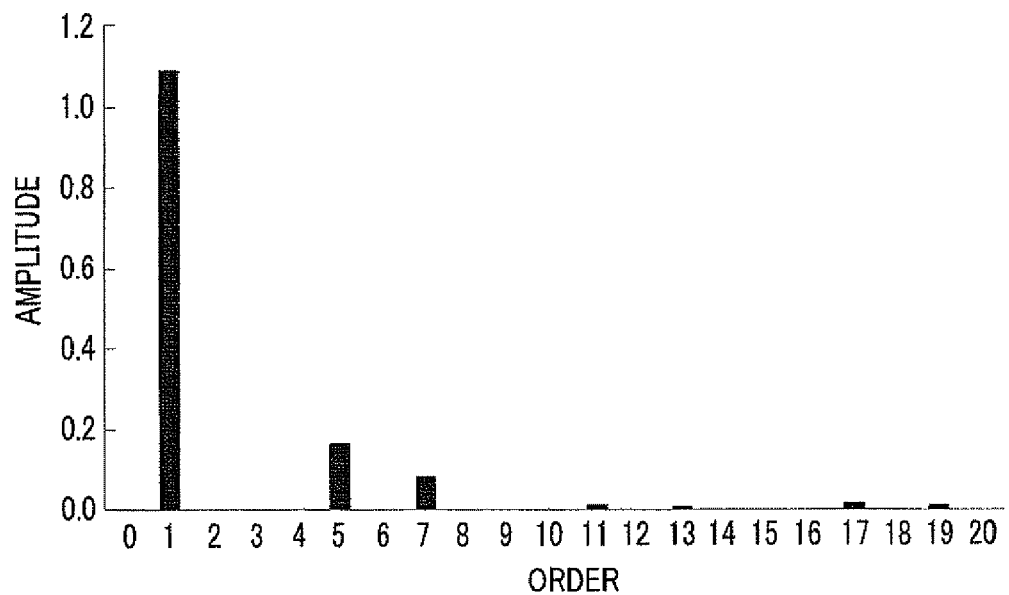
FIG. 9 is a graph schematically illustrating the frequency spectrum of the trapezoidal input voltage illustrated in FIG. 8.

Next, the waveform of a trapezoidal input voltage for normal three-phase motors is illustrated in FIG. 8; this trapezoidal input voltage is known as an input voltage that contains a lot of the fifth and seventh harmonic voltage components. The frequency spectrum of the trapezoidal input voltage illustrated in FIG. 8 is illustrated in FIG. 9. FIG. 9 clearly shows that most of the harmonic voltage components contained in the trapezoidal input voltage are the fundamental-harmonic voltage components (that is, frequency components thereof), and the range from the seven percent to the eighteen percent of the harmonic voltage components are the fifth and seventh harmonic voltage components. These fifth and seventh harmonic voltage components may cause the sixth torque ripples to be easily induced in the output of normal three-phase motors. As shown in the example illustrated in FIGS. 8 and 9, normally, the higher the order of the harmonic voltage components is, the lower the magnitude of them is in accordance with the shape of the stator poles and that of the rotor poles.

Next, the relationship between harmonic voltage components in the input of five-phase motors and torque ripples in the output thereof will be described hereinafter.

Figure 10:
FIG. 10 is a graph schematically illustrating the relationship between harmonic voltage components in the input of a typical five-phase motor and impact factors for torque ripples in the output thereof with respect to the orders of harmonic voltage components.

FIG. 10 shows a graph whose horizontal axis represents the orders of harmonic voltage components in the input of a typical five-phase motor and whose vertical axis represents the impact factors for torque ripples in the output thereof with respect to the orders of harmonic voltage components. Note that a sinusoidal current was used to be supplied to each of the five-phase stator windings in order to obtain the characteristics illustrated in the graph in FIG. 10. Values of the harmonic voltage components in the input of the typical five-phase motor are illustrated in FIG. 10.

The first voltage components, that is, the fundamental voltage components are calculated to be a constant value of $3/2 \cdot Vo \cdot Io$ where Vo represents the amplitude of each five-phase voltage and Io represents the amplitude of each five-phase current.

The second, third, fifth, seventh, eighth, tenth, thirteenth, fifteenth, seventeenth, eighteenth, and twentieth harmonic voltage components do not generate torque ripples in principle because the torque ripples can be cancelled out among the five-phase voltages.

Figure 11:
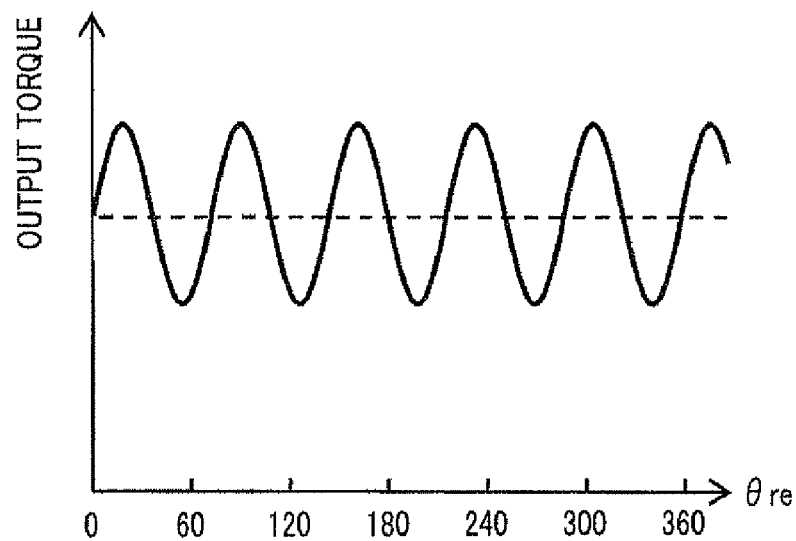
FIG. 11 is a graph schematically illustrating an output torque created by fourth and sixth harmonic voltage components inputted to the five-phase motor.

As illustrated in FIG. 11, the fourth and sixth harmonic voltage components induce the fifth torque ripples. However, a circumferentially symmetric arrangement of the magnetic poles of a normal rotor can reduce even-ordered harmonic voltage components contained in the input of normal three-phase motors, making it possible to reduce the fifth torque ripples.

Figure 12:
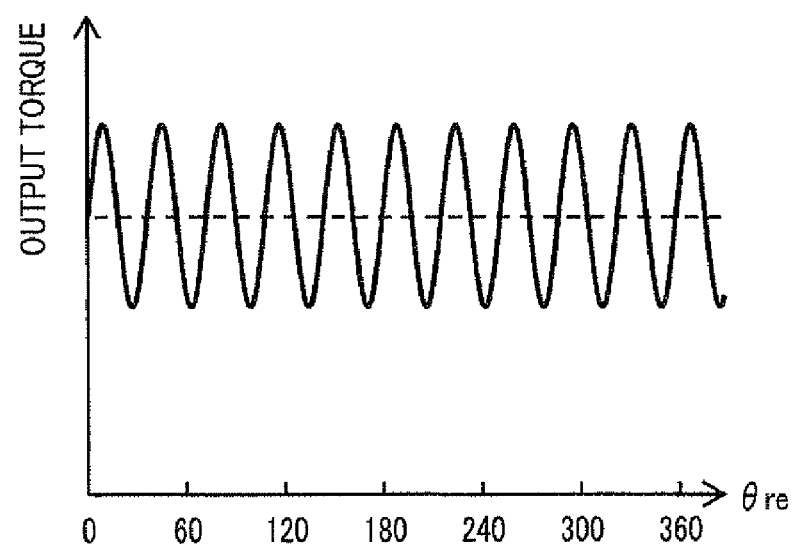
FIG. 12 is a graph schematically illustrating an output torque created by ninth and eleventh harmonic voltage components inputted to the five-phase motor.

The ninth and eleventh harmonic voltage components induce the tenth torque ripples as illustrated in FIG. 12. However, because such higher-order harmonic voltage components have a relatively low absolute value, and various known torque-ripple reducing methods can be applied to reduce higher-order torque ripples due to such higher-order harmonic voltage components. Thus, the higher-order toque ripples have little influence on the output of the normal five-phase motors.

These results show that five-phase motors achieve the output-torque characteristics with little torque ripples. In addition, it has been empirically known that rotary machines designed to be driven by a multiple-phase cyclic alternating currents normally have a resistant to vibrations, such as sympathetic vibrations.

Thus, the five-phase motors 10 and 10A according to the first embodiment achieve, in addition to their benefits set forth above, the output-torque characteristics with little torque ripples while reducing their vibrations in the motors and/or noise.

Second Embodiment

Figure 13:
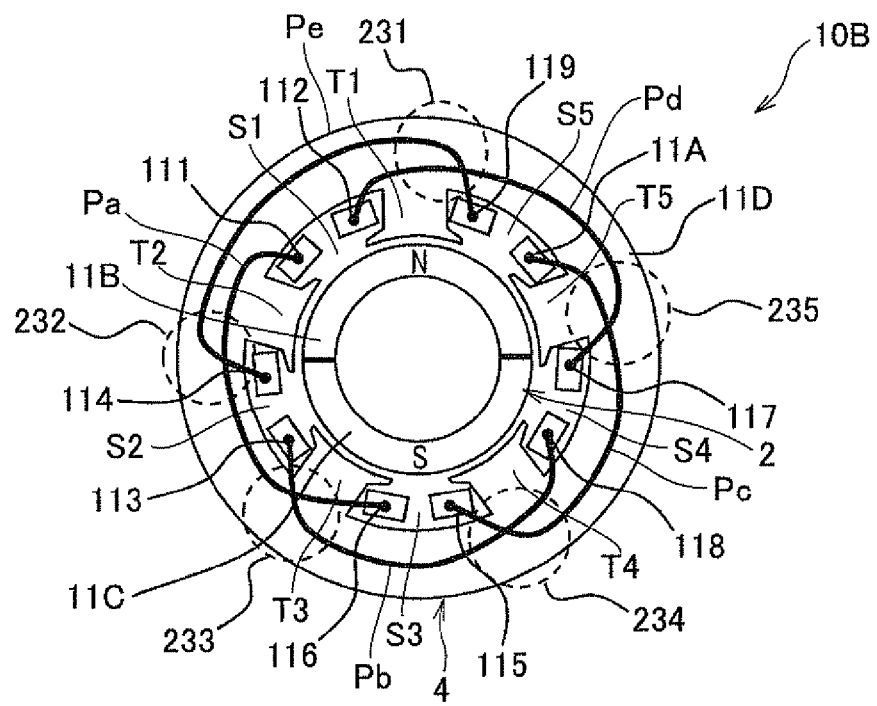
FIG. 13 is a lateral cross sectional view of a five-phase motor according to the second embodiment of the present invention.

A five-phase motor 10B according to the second embodiment of the present invention will be described hereinafter with reference to FIG. 13. Like parts between the five-phase motors according to the first and second embodiments, to which like reference characters are assigned, are omitted or simplified in description.

The configuration of the rotor 2 and that of the stator core 4 are substantially identical to those of the five-phase motor 10 illustrated in FIG. 1B.

There is a difference point between the five-phase motors 10 and 10 B.

The difference point is that the arrangement of the five-phase stator windings 111 and 116, 113 and 118, 115 and 11A, 117 and 112, 119 and 114 in the five-phase motor 10B is different from that of the five-phase stator windings 111 and 116, 113 and 118, 115 and 11A, 117 and 112, 119 and 114 in the five-phase motor 10.

Specifically, the a-phase winding 111 is wound in one circumferential end of the slot S1 closer to the tooth T2 than the other circumferential end is. The a-phase winding 116 is wound in one circumferential end of the slot S3 closer to the tooth T3 than the other circumferential end is. The b-phase winding 113 is wound in one circumferential end of the slot S2 closer to the tooth T3 than the other circumferential end is. The b-phase winding 118 is wound in one circumferential end of the slot S4 closer to the tooth T4 than the other circumferential end is.

The c-phase winding 115 is wound in one circumferential end of the slot S3 closer to the tooth T4 than the other circumferential end is. The c-phase winding 11A is wound in one circumferential end of the slot S5 closer to the tooth T5 than the other circumferential end is. The d-phase winding 117 is wound in one circumferential end of the slot S4 closer to the tooth T5 than the other circumferential end is. The d-phase winding 112 is wound in one circumferential end of the slot S1 closer to the tooth T1 than the other circumferential end is.

The e-phase winding 119 is wound in one circumferential end of the slot S5 closer to the tooth T1 than the other circumferential end is. The e-phase winding 114 is wound in one circumferential end of the slot S2 closer to the tooth T2 than the other circumferential end is.

The winding arrangement of the five-phase motor 10B reduces the mutual intersections and interferences among the ends of the five-phase stator windings in the rotor's axial direction in comparison to those among the ends of the five stator windings of the five-phase motor 10 in the rotor's axial direction. Dashed circles illustrated in FIG. 13 represent the mutual intersections among the ends of the five-phase stator windings of the five-phase motor 10B in the rotor's axial direction. This winding arrangement of the five-phase motor 10B facilitates the winding of each of the five-phase windings in manufacturing the stator.

Figure 14:
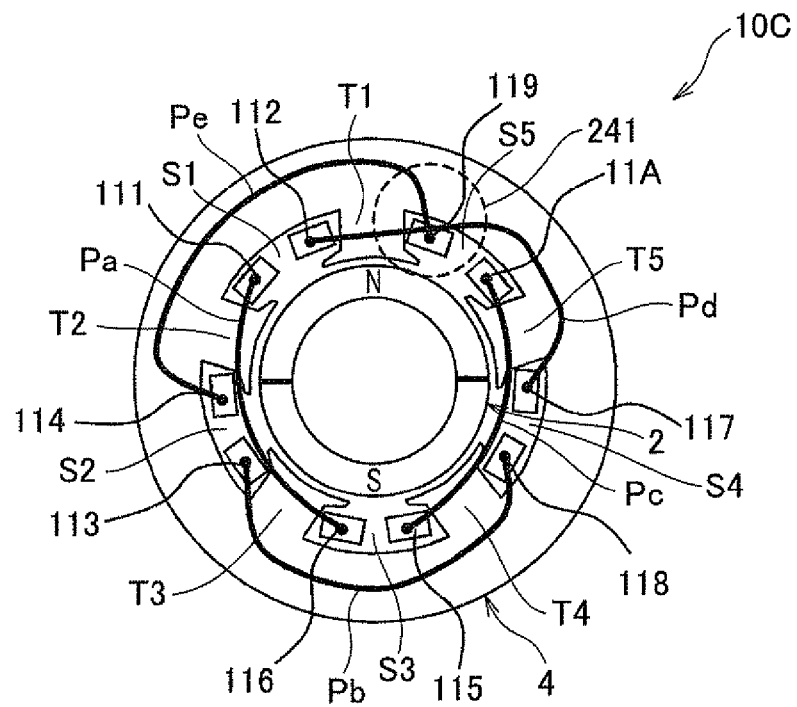
FIG. 14 is a lateral cross sectional view of a five-phase motor according to the first modification of the second embodiment of the present invention.

FIG. 14 schematically illustrates the structure of a five-phase motor 10C according to the first modification of the second embodiment of the present invention. Like parts between the five-phase motors according to the second embodiment and the first modification, to which like reference characters are assigned, are omitted or simplified in description.

There is a difference point between the five-phase motors 10B and 10C.

The difference point is that the arrangement of the five-phase stator windings 111 and 116, 113 and 118, 115 and 11A, 117 and 112, 119 and 114 in the five-phase motor 10C is different from that of the five-phase stator windings 111 and 116, 113 and 118, 115 and 11A, 117 and 112, 119 and 114 in the five-phase motor 1013.

Specifically, one ends Pa, Pb, Pc, Pd, and Pe of the five-phase motor 10C in the rotor's axial direction, which project from a corresponding one end surface of the stator core 4 are separated into the first group of ends Pe, Pb, and Pd, and the second group of ends Pa and Pc. The ends Pa and Pc of the second group are arranged inside the ends Pe, Pb, and Pd of the first group. Thus, the ends Pe, Pb, and Pd of the first group will be referred to as "outside ends", and the ends Pa and Pc of the second group will be referred to as "inside ends". Windings each having a corresponding one of the outside ends will be referred to as outside windings, and windings each having a corresponding one of the inside ends will be referred to as inside windings.

In arranging the five-phase stator windings in the stator core 4, the outside winding (e-phase winding) 119 and 114 is wound first in the slots S5 and S2. Similarly, the outside winding (b-phase winding) 113 and 118 is wound in the slots S2 and S4.

Next, the d-phase winding 117 and 112 is wound in the slots S4 and S1 so that the outside end Pd intersects the outside end Pe of the e-phase winding 119 and 114 at a dashed circle 241 close to the e-phase winding 119.

Next, the inside winding (a-phase winding) 111 and 116 is wound in the slots S1 and S3 such that the inside end Pa is arranged inside the outside ends Pb and Pe without intersecting the outside ends Pb and Pe.

Similarly, the inside winding (c-phase winding) 115 and 11A) is wound in the slots S3 and S5 such that the inside end Pc is arranged inside the outside ends Pb and Pd without intersecting the outside ends Pb and Pd.

The other ends of the five-phase stator windings of the five-phase motor 10C include the outside ends and inside ends. The inside ends are arranged inside the outside ends in the same manner as the one ends of the five-phase stator windings.

The winding arrangement of the five-phase motor 10C further reduces the mutual intersections and interferences among the ends of the five-phase stator windings in the rotor's axial direction in comparison to those among the ends of the five-phase stator windings of each of the five-phase motors 10 and 10B in the rotor's axial direction.

Figure 15:
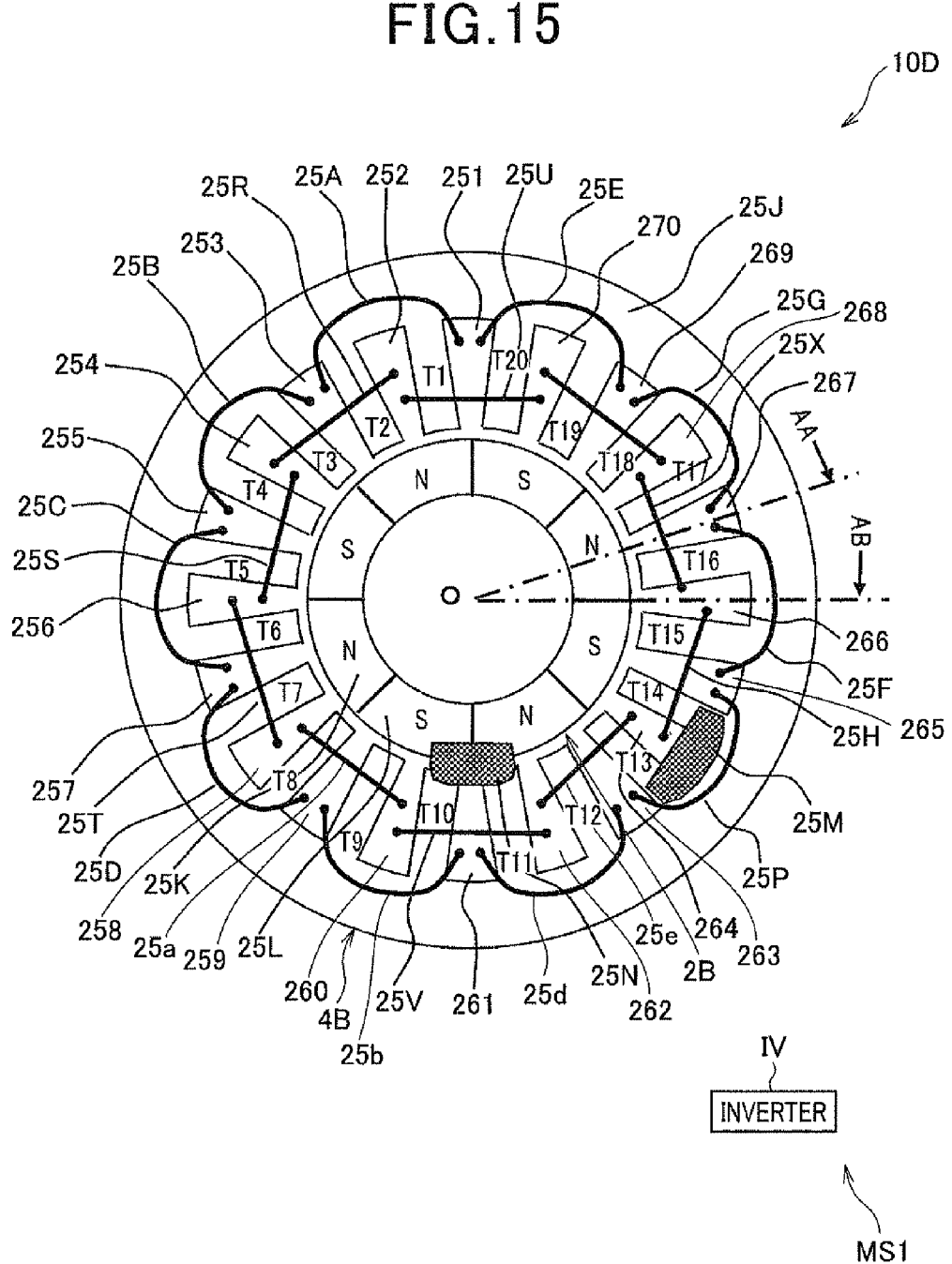
FIG. 15 is a lateral cross sectional view schematically illustrates an eight-pole, five-phase motor according to the second modification of the second embodiment.

FIG. 15 schematically illustrates a five-phase motor 10D designed by expanding the two-pole, five-phase motor 10C illustrated in FIG. 14 as an eight-pole, five-phase motor.

The eight-pole, five-phase motor 10D includes a rotor 28 and a stator core 4B. The rotor 2B has, at its outer circumferential surface, four pairs of N and S poles 25K and 25L. The four pairs of N and S poles 25K and 25L constitute the entire circumference of the rotor 2B. The N and S poles 25K and 25L are circumferentially arranged alternately at regular pitches.

The stator core 4B includes an annular back yoke 25J and twenty teeth T1 to T20 radially inwardly projecting from the inner circumference of the back yoke 25J and circumferentially arranged at equal pitches therebetween. Each of the teeth T1 to T20 serves as a salient pole. The inner circumferential surface of each of the teeth (salient poles) T1 to T20 has a concavely circumferentially rounded shape with a curvature identical to that of the outer surface of the N and S poles 25N and 25L of the rotor 2B. Spaces between circumferentially adjacent teeth T1 to T20 provide twenty slots 251 to 270 of the stator core 4B.

Circumferentially continuous five slots in the twenty slots 251 to 270 are arranged within 360°; the electrical angle of 360° corresponds to two-pole pitch (one north-pole pitch or one south-pole pitch) of the rotor 23. That is, a pitch between each pair of circumferentially continuous five slots in the twenty slots 251 to 270 is set to substantially 72° (72 electrical degrees).

Specifically, assuming that the number (8) of the poles of the rotor 2B is set to N (N is an even number equal to or greater than 2), a total number (20) of the slots 251 to 271 is set to the product of 5/2 and the number N (8).

A five-phase stator coil consisting of four a-phase windings 25A, 25T, 25d, and 25X, four b-phase windings 25R, 25D, 25e, and 25G, four c-phase windings 25B, 25a, 25P, and 25f, four d-phase windings 25S, 25b, 25H, and 25E, and four e-phase windings 25C, 25V, 25F, and 25U is installed in the stator core 4B.

The a-phase winding 25A is wound in the slots 251 and 253 such that its one end in the rotor's axial direction is located opposing the back yoke 25J, the c-phase winding 25B is wound in the slots 253 and 255 such that its one end in the rotor's axial direction is located opposing the back yoke 25J, and the b-phase winding 25R is wound in the slots 252 and 254 such that its one end in the rotor's axial direction is located inside the one end of the a-phase winding 25A and the one end of the c-phase winding 25B. Thus, the a- and c-phase windings 25A and 25B will also be referred to as "outside windings", and the b-phase winding 25R will also be referred to as "inside winding" hereinafter.

Similarly, the e-phase winding 25C is wound in the slots 255 and 257 such that its one end in the rotor's axial direction is located opposing the back yoke 25J, and the d-phase winding 25S is wound in the slots 254 and 256 such that its one end in the rotor's axial direction is located inside the one end of the c-phase stator winding 25B and the one end of the e-phase winding 25C. Thus, the c- and e-phase windings 25B and 25C will also be referred to as "outside windings", and the d-phase winding 25S will also be referred to as "inside winding" hereinafter.

The b-phase winding 25D is wound in the slots 257 and 259 such that its one end in the rotor's axial direction is located opposing the back yoke 25J, and the a-phase winding 25T is wound in the slots 256 and 258 such that its one end in the rotor's axial direction is located inside the one end of the e-phase winding 25C and the one end of the b-phase winding 25D. Thus, the e- and b-phase windings 25C and 25D will also be referred to as "outside windings", and the b-phase winding 25T will also be referred to as "inside winding" hereinafter.

The d-phase winding 25b is wound in the slots 259 and 261 such that its one end in the rotor's axial direction is located opposing the back yoke 25J, and the c-phase winding 25a is wound in the slots 258 and 260 such that its one end in the rotor's axial direction is located inside the one end of the b-phase winding 25D and the one end of the d-phase winding 25b. Thus, the b- and d-phase windings 25D and 25b will also be referred to as "outside windings", and the c-phase winding 25a will also be referred to as "inside winding" hereinafter.

The a-phase winding 25d is wound in the slots 261 and 263 such that its one end in the rotor's axial direction is located opposing the back yoke 25J, and the e-phase winding 25V is wound in the slots 260 and 262 such that its one end in the rotor's axial direction is located inside the one end of the d-phase winding 25b and the one end of the a-phase winding 25d. Thus, the d- and a-phase windings 25b and 25d will also be referred to as "outside windings", and the e-phase winding 25V will also be referred to as "inside winding" hereinafter.

The c-phase winding 25P is wound in the slots 263 and 265 such that its one end in the rotor's axial direction is located opposing the back yoke 25J, and the b-phase winding 25e is wound in the slots 262 and 264 such that its one end in the rotor's axial direction is located inside the one end of the a-phase winding 25d and the one end of the c-phase winding 25P. Thus, the a- and c-phase windings 25d and 25P will also be referred to as "outside windings", and the b-phase winding 25e will also be referred to as "inside winding" hereinafter.

The e-phase winding 25F is wound in the slots 265 and 267 such that its one end in the rotor's axial direction is located opposing the back yoke 25J, and the d-phase winding 25H is wound in the slots 264 and 266 such that its one end in the rotor's axial direction is located inside the one end of the e-phase winding 25F and the one end of the c-phase winding 25P. Thus, the e- and c-phase windings 25F and 25P will also be referred to as "outside windings", and the d-phase winding 25H will also be referred to as "inside winding" hereinafter.

The b-phase winding 2513 is wound in the slots 267 and 269 such that its one end in the rotor's axial direction is located opposing the back yoke 25J, and the a-phase winding 25X is wound in the slots 266 and 268 such that its one end is located inside the one end of the e-phase winding 25F and the one end of the b-phase winding 25G. Thus, the e- and b-phase windings 25F and 25G will also be referred to as "outside windings", and the a-phase winding 25X will also be referred to as "inside winding" hereinafter.

The d-phase winding 25D is wound in the slots 269 and 251 such that its one end in the rotor's axial direction is located opposing the back yoke 25J, and the c-phase winding 25P is wound in the slots 268 and 270 such that its one end in the rotor's axial direction is located inside the one end of the b-phase winding 25G and the one end of the d-phase winding 25E. Thus, the b- and d-phase windings 25G and 25E will also be referred to as "outside windings", and the c-phase winding 25P will also be referred to as "inside winding" hereinafter.

The e-phase winding 25U is wound in the slots 270 and 252 such that its one end in the rotor's axial direction is located inside the one end of the d-phase winding 25E and the one end of the a-phase winding 25A. Thus, the d-phase winding 25E will also be referred to as "outside windings", and the c-phase winding 25U will also be referred to as "inside winding" hereinafter.

The other ends of the outside windings and those of the inside windings in the rotor's axial direction have the same positional relationships as the one ends of the outside windings and those of the inside windings in the rotor's axial direction.

Like the five-phase motor 1013 illustrated in FIG. 14, the outside windings 25A, 25B, 25C, 25D, 25b, 25d, 25P, 25F, 25G, and 25E are wound in the stator core 413, and thereafter, the remaining inside windings 25R, 25S, 25T, 25a, 25V, 25e, 25H, 25X, 25P, and 25U are wound in the stator core 4B.

As well as the five-phase motor 10 according to the first embodiment, current vectors to be supplied to the slots 251 to 270 have relationships relative to each other.

Let us focus on one set of the slots 251 to 255.

Specifically, in the slot 251, a current vector of the positive a-phase current +a to be supplied to the a-phase winding 25A and a current vector of the negative d-phase current −d to be supplied to the d-phase winding 25E are represented by reference numerals 131 and 132 illustrated in FIG. 2, respectively. In the slot 252, a current vector of the positive b-phase current +b to be supplied to the b-phase winding 25R and a current vector of the negative e-phase current −e to be supplied to the e-phase winding 25U are represented by reference numerals 133 and 134 illustrated in FIG. 2, respectively.

In the slot 253, a current vector of the positive c-phase current +c to be supplied to the c-phase winding 25B and a current vector of the negative a-phase current −a to be supplied to the a-phase winding 25A are represented by reference numerals 135 and 136 illustrated in FIG. 2, respectively. In the slot 254, a current vector of the positive d-phase current +d to be supplied to the d-phase winding 25S and a current vector of the negative b-phase current −b to be supplied to the b-phase winding 25R are represented by reference numerals 137 and 138 illustrated in FIG. 2, respectively.

In the slot 255, a current vector of the positive e-phase current +e to be supplied to the e-phase winding 25C and a current vector of the negative c-phase current −c to be supplied to the c-phase winding 25B are represented by reference numerals 139 and 13F illustrated in FIG. 2, respectively.

Specifically, a resultant current vector 13A of the current vectors 131 and 132 represents an A-phase current vector to be supplied to the slot 251, and a resultant current vector 13B of the current vectors 133 and 134 represents a B-phase current vector to be supplied to the slot 252.

A resultant current vector 13C of the current vectors 135 and 136 represents a C-phase current vector to be supplied to the slot 253, and a resultant current vector 13D of the current vectors 137 and 138 represents a D-phase current vector to be supplied to the slot 254.

A resultant current vector 13E of the current vectors 139 and 13F represents an E-phase current vector to be supplied to the slot 255.

Current vectors are supplied to the remaining three sets of the slots 256 to 260, 261 to 265, and 266 to 270 as well as to the set of the slots 251 to 255.

Like the first embodiment, the inverter IV for driving the motor 10D supplies A-, B-, C-, D-, and E-phase currents corresponding to the resultant vectors 13A, 13B, 13C, 13D, and 13E to: the slots 251, 252, 253, 254, and 255; to the slots 256, 257, 258, 259, and 260; to 261, 262, 263, 264, and 265; and to the slots 266, 267, 268, 269, and 270. These A-, B-, C-, D-, and E-phase currents generate a rotating magnetic field through the respective pairs of windings, and the rotating magnetic field creates an output torque. The created output torque turns the rotor 2B. The five-phase motor 10D and the inverter IV provide a motor system MS1.

Like the five-phase motor 10B illustrated in FIG. 14, each end of each of the outside windings 25A, 25B, 25C, 25D, 25b, 25d, 25P, 25F, 25G, and 25E in the rotor's axial direction is arranged opposing the back yoke 25J and outside the corresponding slot positions.

This end arrangement prevents one and the other ends of each outside winding in the rotor's axial direction from blocking one and the other axial opening ends of a corresponding slot between the paired slots corresponding to each outside winding.

For example, one end of the a-phase winding 25A does not block one axial opening end of the slot 252 between the paired slots 251 and 253 corresponding to the a-phase winding 25A.

On the other hand, one and the other ends of each of the inside windings 25R, 25S, 25T, 25a, 25V, 25e, 25H, 25X, 25P, and 25U in the rotor's axial direction is arranged opposing one and the other axial opening ends of a corresponding slot between the paired slots corresponding to each inside winding. For example, one and the other ends of the b-phase winding 25R is arranged opposing one and the other axial opening ends of the slot 253 between the paired slots 25A and 254 corresponding to the b-phase winding 25R.

Because the outside windings have been wound in the stator core 4B, the inside windings can be easily wound in the stator core 4B even if at least one end of at least one inside winding in the rotor's axial direction covers a corresponding pair of outside windings.

This winding arrangement of the five-phase motor 10D prevents the outside windings from intersecting with each other, the inside windings from intersecting with each other, and the outside windings and the inside windings from intersecting with each other. This prevention facilitates the forming of each of the outside windings and inside windings.

In the two-pole, five-phase motor 10C illustrated in FIG. 14, even if the five-phase windings are separated into: the outside windings consisting of the winding 119 and 114, the winding 113 and 118, and the winding 117 and 112; and the inside windings consisting of the winding 111 and 116, and the winding 115 and 11A, the outside windings intersect partially with the inside windings.

However, in five-phase motors having an integer multiple of four poles, such as the five-phase motor 10D illustrated in FIG. 15, it is possible to arrange the outside windings and the inside windings so as to prevent the outside windings and the inside windings from intersecting with each other.

In each of the first and second embodiments and their modifications, in forming one phase stator winding in the corresponding stator core, a guiding member can be provided to guide the winding of a wire in a corresponding pair of slots to for the one phase stator winding without intersecting with another phase stator winding.

For example, in the five-phase motor 10D illustrated in FIG. 15, for winding a wire in the corresponding slots 263 and 265 to form the c-phase winding 25P, a guiding member 25M can be placed to cover the radially outer portion of one axial opening end of the slot 264 between the slots 263 and 265. This guiding member 25M makes it possible to easily wind the wire in the corresponding slots 263 and 265 to form the stator winding 25P without blocking the slot 264 between the slots 263 and 265.

Similarly, in the five-phase motor 10D illustrated in FIG. 15, for winding a wire in the corresponding slots 260 and 262 to form the e-phase winding 25V, a guiding member 25N can be placed to block the radially inner portion of one axial opening end of the slot 261 between the slots 260 and 262. This guiding member 25N makes it possible to easily wind the wire in the corresponding slots 260 and 262 to form the stator winding 25V without the wound wire falling outside the slots 260 and 262.

Like the guiding members 25M and 25N, a guiding member can be provided according to the shape and/or the location of at least one-phase stator winding to be wound so as to guide the winding of a wire in a corresponding pair of slots so as to form the at least one-phase stator winding without intersecting with another stator winding.

In each of the first and second embodiments and their modifications, a wire can be directly wound in a corresponding stator core so as to form at least one-phase stator winding, or a previously formed winding having a number of turns can be inserted in a corresponding pair of slots and fixed thereto so as to form at least one-phase stator winding. In each of the first and second embodiments and their modifications, if needed, an insulating paper can be installed in each slot to maintain insulation between the corresponding stator core and the corresponding phase stator winding, and/or fixation of each axial end of each phase stator winding can be carried out.

Next, a modification of the five-phase motor 10D illustrated in FIG. 15 will be described hereinafter. A five-phase motor 10E according to the modification of the five-phase motor 10D is configured such that the shape of each slot, the arrangement and shape of each phase stator winding, how to install the insulating paper in each slot, and the shape of the back yoke are improved. This improvement aims at:

facilitating the winding of a wire in the stator core to form each phase stator winding;

increasing the winding space factor;

reducing the length of each end of the stator winding in the rotor's axial direction; and reducing the size of the five-phase motor 10E.

Figure 16:
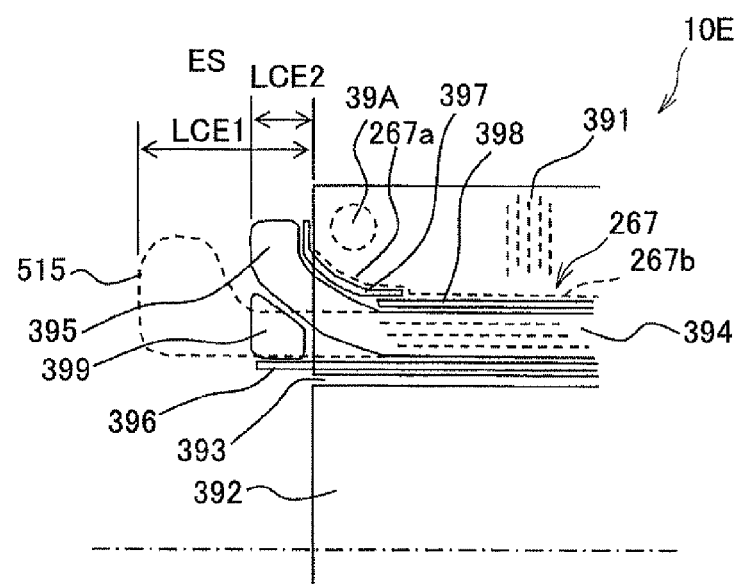
FIG. 16 is an axial cross sectional view of the stator illustrated in FIG. 15 taken on line AA to AA in FIG. 15.

FIG. 16 is an axial cross sectional view of the stator core 413 of the five-phase motor 10E illustrated in FIG. 15 taken on line AA to O passing through the slot 267; this reference character O represents a center axis of the rotor 213.

Reference character 391 represents a stator core having a substantially identical structure to the structure of the stator core 4B. The stator core 391 is made up of a plurality of magnetic steel sheets stacked in alignment in the axial direction of the motor. Reference character 392 represents a rotor having a substantially identical structure to the structure of the rotor 213. Reference character 393 represents an air gap between the inner circumferential surface of the stator core 391 and the outer circumferential surface of the rotor 392.

Reference character 394 represents the e-phase winding 25F or the a-phase winding 25X wound in the slot 267. Reference character 395 represents one end of the winding 394 in the rotor's axial direction circumferentially extending over the back yoke 25J to be installed in a corresponding slot away from the slot 267 by two slot pitches; this one end 395 does not block a corresponding adjacent slot 266 or 268.

The slot 267 is gradually bent outwardly toward one axial end surface (first end surface) ES of the stator core 391. This allows the winding 394 to be gradually bent outwardly toward the first end surface ES of the stator core 391 along the slot 267; this outwardly bent portion of the winding 394 provides the one end 395 thereof.

Figure 28:
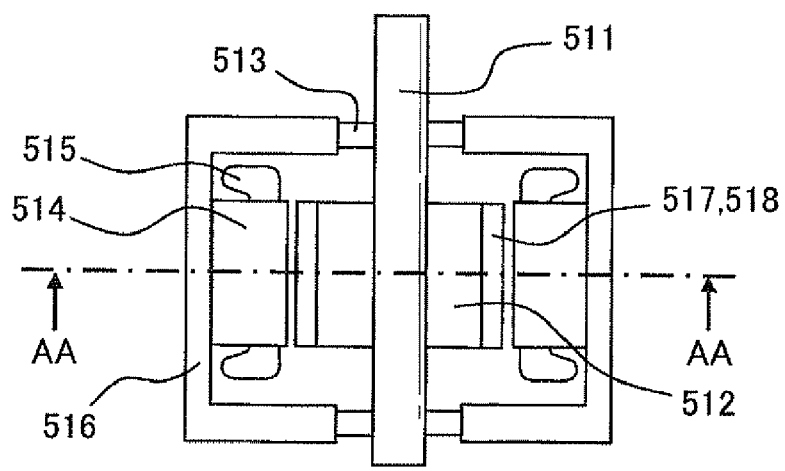
FIG. 28 is an axial cross sectional view illustrating a schematic structure of a typical three-phase motor.
Figure 29:
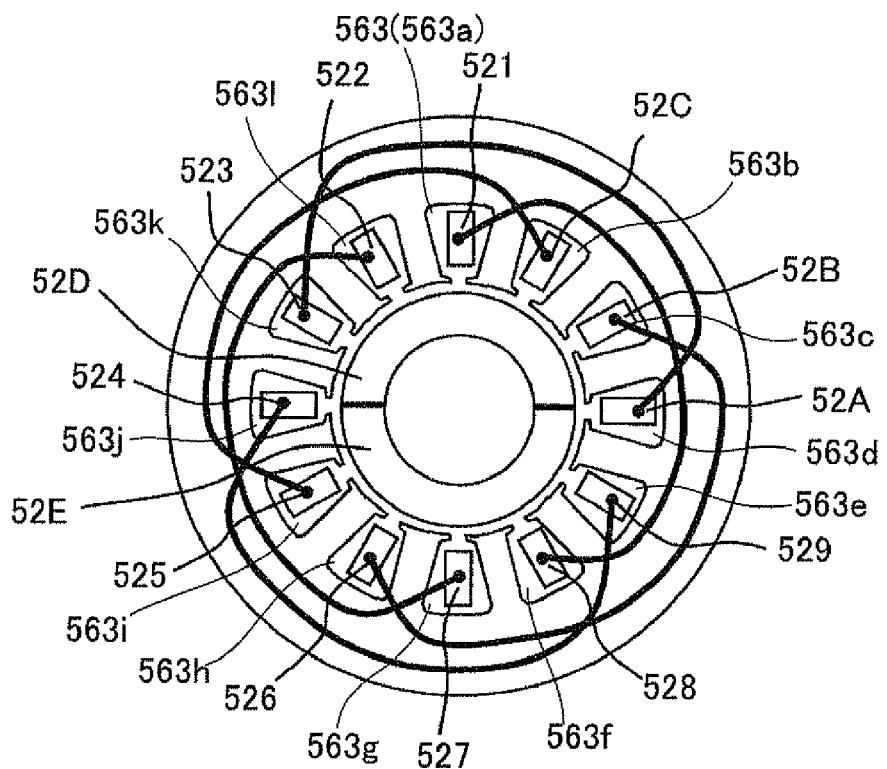
FIG. 29 is a lateral cross sectional view taken on line AA-AA in FIG. 28.
Figure 30:
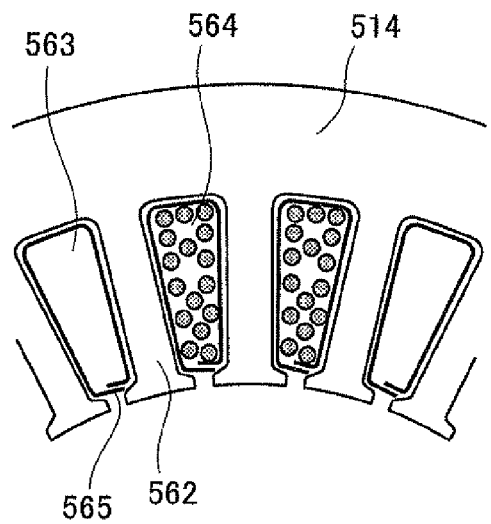
FIG. 30 is a partially lateral cross sectional view schematically illustrates, in enlarged scale, a part of the motor illustrated in FIG. 29.

These results reduce the length LCE2 of the one end 395 of the winding 394 in the rotor's axial direction in comparison to the length LCE1 of one end 515 of a conventional motor in the rotor's axial direction illustrated in FIG. 28; this one end 515 is illustrated by dashed lines in FIG. 16.

Each slot, such as the slot 267, of the five-phase motor 10E is designed to radially expand outwardly as it approaches the first end surface of the stator core 391. For example, the slot 267 of the five-phase motor 10E can gradually expand as it approaches the first end surface ES of the stator core 391, or can expand stepwise as it approaches the first end surface ES of the stator core 391 so as to form a two-stepped, three-stepped, or four-stepped portion. Note that, to the outwardly expanded portion of the slot 267, reference character 267a is assigned, and, to the axially aligning portion of the slot 267, reference character 267b is assigned.

This outward expand of each slot aims at smoothly bending a corresponding winding so as to serve a projecting portion of the corresponding winding from the first end surface ES of the stator core 391 as the one end 395. The greater the number of step of each slot is, the more the corresponding winding is smoothly bent. However, the increase in the number of step of each slot increases the number of different types of magnetic steel sheets used to form the stator core 4B to thereby increase the cost of molds required to prepare the different types of magnetic steel sheets. That is, there is a trade-off between the increase in the number of step of each slot and the increase in the cost of the molds. According to need, it is possible to select the number of step of each slot.

Reference character 399 represents one end of the a-phase winding 25X in the rotor's axial direction illustrated in FIG. 15. The a-phase winding 25X is wound in the paired slots 266 and 268 so as to block the inner side of one axial opening end of the slot 267. Because the a-phase winding (inside winding) 25X is wound in the paired slots 266 and 268 after the winding 394 has been wound in the corresponding paired slots, the block does not adversely affect on the winding of the winding 394. These results maintain the length of the one end 399 of the a-phase winding 25X in the rotor's axial direction to be equal to or shorter than the length LCE2 of the one end 395 of the winding 394 in the rotor's axial direction.

Reference characters 396, 397, and 398 represent insulating papers for ensuring electrical insulation between the stator core 391 and the winding 394. Insulating papers have a thickness and hardness sufficient to ensure high-voltage insulation, and therefore, how insulating papers are shaped and arranged in each slot is one of important techniques in motors, and has a great influence on the winding space factor in each slot.

Normally, a substantially cylindrical insulating paper is inserted in each slot such that its each longitudinal end projects from one and the other axial end surfaces of the stator core by 10 mm or thereabout. An overlap between different insulating papers in each slot is normally not used because the winding space factor in each slot is reduced.

In the five-phase motor 10E illustrated in FIG. 16, the insulating paper 396 is located at the opening-end side of the slot 267 in the axial direction thereof to maintain electrical insulation between the winding 394 and the rotor 2B. The insulating paper 396 projects outwardly from the first end surface ES and the other end surface (second end surface, not shown) of the stator core 391 by a preset length to thereby maintain electrical insulation of the one axial end 399 and the other axial end of the a-phase winding 25X, respectively.

The insulating paper 398 is located at the back-yoke side of the axially aligning portion 267b of the slot 267 in the axial direction thereof to maintain electrical insulation between the winding 394 and the back yoke 25J of the stator core 319. One axial end of the insulating paper 398 is located close to the boundary between the axially aligning portion 267b and the outwardly expanded portion 267a thereof, and the other axial end thereof projects outwardly from the second end surface of the stator core 391 by a preset length to thereby maintain electrical insulation of the other end of the winding 394 in the rotor's axial direction.

The insulating paper 397 is located at the back-yoke side of the outwardly expanded portion 267a of the slot 267 so as to be bent outwardly along the outwardly expanded portion 267a to thereby maintain electrical insulation between the one end 395 and the back yoke 25J of the stator core 319. The insulating paper 397 has first and second axial ends, the first axial end of which is overlapped with the one axial end of the insulating paper 398.

The second axial end of the insulating paper 397 projects outwardly from the first end surface ES of the stator core 391 to thereby maintain electrical insulation of the one end 395 of the winding 394 and the back yoke 25J of the stator core 319.

Even if the insulating papers 397 and 398 are partially overlapped with each other, because the overlapped portion is located at an end of the outwardly expanded portion 267a that has a diameter greater than that of the axially aligning portion 267b, it is possible to prevent the thickness of the winding 394 from being restricted due to the overlapped portion.

As described above, the configuration of the insulating papers 396, 397, and 398 adapts to the shape change of each slot. Because separated insulating papers, such as insulating papers 396, 397, and 398, can be used to insulate different phase stator windings disposed in each slot, it is possible to design the shape of an insulating paper at each of the first and second end surface sides of the stator core 319. For example, an insulating paper can be disposed in each slot without projecting from each axial opening end thereof. As the insulating paper 396 located at the opening-end side of each slot, separated insulating papers can be used.

Figure 17A:
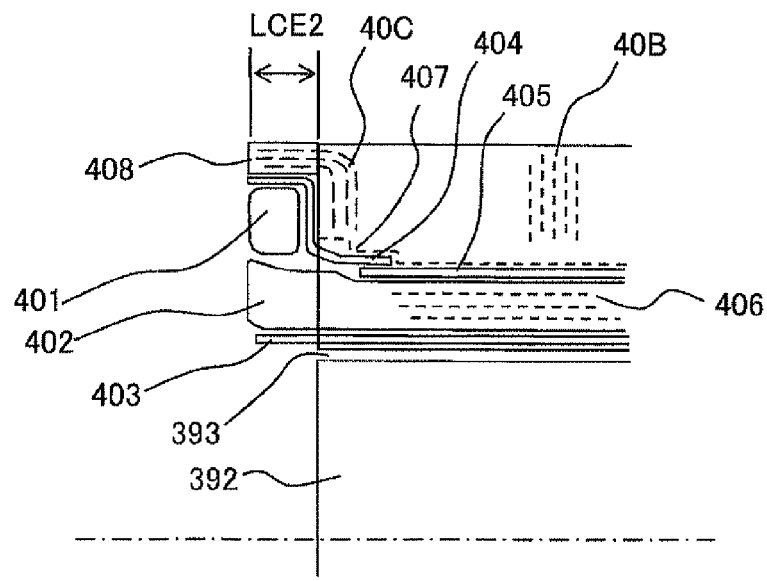
FIG. 17A is an axial cross sectional view of the stator illustrated in FIG. 15 taken on line AB to AB in FIG. 15.

FIG. 17A is an axial cross sectional view of the stator core 4B of the five-phase motor 10E illustrated in FIG. 15 taken on line AB to O passing through the slot 266.

Reference character 40B represents a stator core having a substantially identical structure to the structure of the stator core 4B. The stator core 40B is made up of a plurality of magnetic steel sheets stacked in alignment in the axial direction of the motor. Reference character 392 represents a rotor having a substantially identical structure to the structure of the rotor 2B. Reference character 393 represents an air gap between the inner circumferential surface of the stator core 40B and the outer circumferential surface of the rotor 392.

Reference character 406 represents the d-phase winding 25H or the a-phase winding 25X wound in the slot 266. Reference character 401 represents one end of the winding 406 in the rotor's axial direction circumferentially extending over the back yoke 25J. Specifically, the winding 406 is wound in the slot 206 and a corresponding slot away from the slot 266 by two slot pitches such that its one end 401 blocks the inner side of one axial opening end of the slot 266. This configuration also reduces the length LCE2 of the one end 401 of the winding 406 in the rotor's axial direction in comparison to the length LCE1 (see FIG. 16) of one end 515 of a conventional motor in the rotor's axial direction illustrated in FIG. 28. Reference characters 403, 404, and 405 represents insulating papers configured to be identical to the insulating papers 396, 397, and 398, respectively.

In FIG. 16, because the slot 267 is expanded as it approaches the first end surface ES of the stator core 319, the cross section of a total circumferential magnetic path in the back yoke 25J close to a dashed circle 39A is reduced. This reduction may increase the flux density at the back yoke 25J, causing the magnetic resistance thereat to increase. In addition, magnetic fluxes in the back yoke 25J tend to flow through the inner side of the back yoke 25J. Because the stator core 391 is made up of a plurality of magnetic steel sheets stacked in alignment in the axial direction of the rotor 392, the flux components in the axial direction of the rotor 392 may induce eddy currents in the magnetic steel sheets.

In order to solve these problems, the stator core 40B is configured such that part of the outer peripheral portions 408 of the laminated electromagnetic steel sheets 40C in the axial direction of the rotor 392, which constitutes the back yoke 25J, are bent to be directed in the rotor's axial direction by, for example drawing, so as to surround the one end 401 of the winding 406 (see FIG. 17A). This configuration increases the cross section of a total circumferential magnetic path in the back yoke 25J. Because the magnetic paths 408 are included in the same laminated electromagnetic steel sheets 40C, magnetic fluxes are allowed to easily flow therethrough without inducing excessive eddy currents.

Figure 17B:
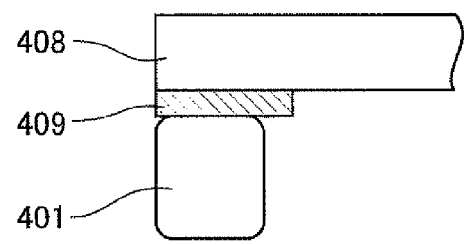
FIG. 17B is an enlarged view of a part of the stator illustrated in FIG. 17A.

In addition, as illustrated in FIG. 17B, a thermally conductive member 409 having electrical insulation can be disposed between the one end 401 of the winding 406 and the extended portion 408 of the back yoke 25J. The thermally conductive member 409 effectively dissipates heat, such as Joule heat, from the one end of the winding 406 to the back yoke 25J so as to reduce the heat resistance, thus improving the characteristics of the five-phase motor 10E.

The entire outer peripheral portions 408 of the laminated electromagnetic steel sheets 40C in the axial direction of the rotor 392, which constitutes the back yoke 25J, can be bent to be directed in the axial direction.

Because the outer peripheral portions 408 of the laminated electromagnetic steel sheets 40C function as an additional magnetic paths, in place of the outer peripheral portions of the laminated electromagnetic steel sheets 40C, a magnetic member can be used. The configuration of the stator core 40B illustrated in FIG. 17A can be applied to alternative soft magnetic stator cores, such as powder magnetic stator cores in place of the stator core 4B made up of the laminated electromagnetic steel sheets 40C. The configuration of the stator core 40B illustrated in FIG. 17A can also be applied to five-phase motors each having a stator core assembly consisting of a plurality of core segments.

Figure 18:
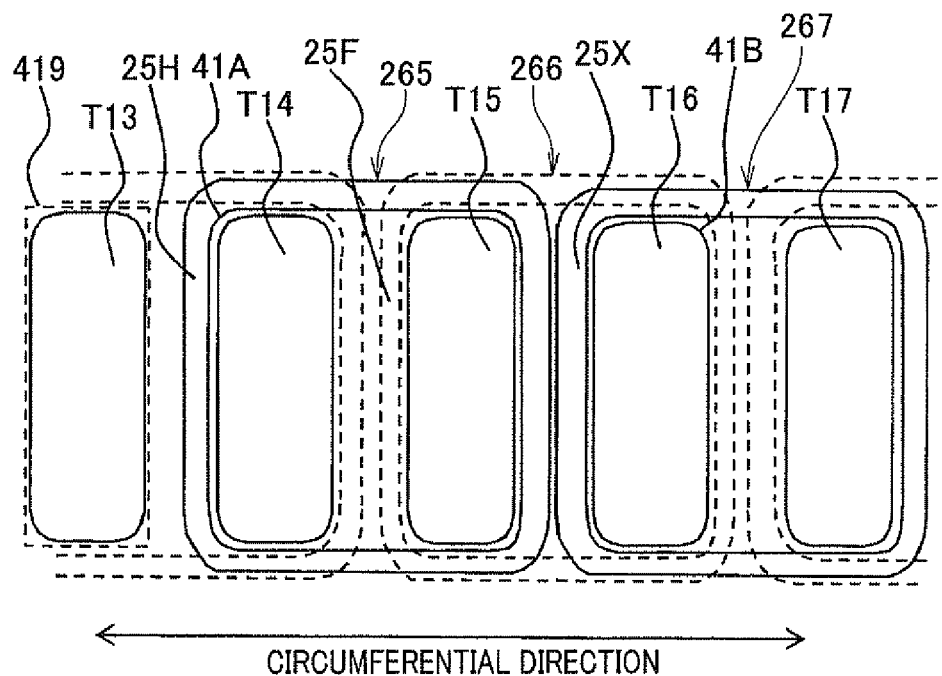
FIG. 18 is a developed view schematically expanding a part of the stator illustrated in FIG. 15 in the circumferential direction when being viewed from the rotor side.

FIG. 18 is a view schematically expanding a part of the stator illustrated in FIG. 15 in the circumferential direction when being viewed from the rotor side. The horizontal direction of FIG. 18 corresponds to the circumferential direction of the stator core 4B, and the vertical direction of FIG. 18 corresponds to the axial direction of the rotor 2B.

Reference characters 411, 412, 413, 414, and 415 represent the inner circumferential surfaces of the teeth T13, T14, T15, T16, and T17, respectively. Reference characters 416, 418, and 417 represent the d-phase winding 25H, the e-phase winding 25F, and the a-phase winding 25X, respectively. The d-phase winding 416 and the e-phase winding 418 are installed in the same slot 265, and the e-phase winding 418 and the a-phase winding 417 are installed in the same slot 266.

The shape of the inner circumferential surface of each of the teeth of conventional motors has a rectangular shape illustrated by dashed lines 419. In comparison to the shape, the inner circumferential surface of each of the teeth T13, T14, T15, T16, and T17 has a substantially rectangular or circular shape with four rounded corners 41B. This shape of each of the teeth T13, T14, T15, T16, and T17 allows a corresponding pair of windings to be smoothly wound therearound.

The inner circumferential portion of each of the teeth T13, T14, T15, T16, and T17 can be formed down stepwise from the innermost circumferential surface toward the back yoke 25J.

Specifically, the inner circumferential portion of each of the teeth T13, T14, T15, T16, and T17 can be formed with a down two-, three-, or four-stepped portion. For example, the laminated first (innermost) electromagnetic steel sheet, the second electromagnetic steel sheet, and the third electromagnetic steel sheet, which are laminated in alignment, corresponding to the inner circumferential portion of each of the teeth T13, T14, T15, T16, and T17 can be formed such that the area of the third electromagnetic steel sheet is greater than that of the second electromagnetic steel sheet, and the area of the second electromagnetic steel sheet is greater than that of the first electromagnetic steel sheet. The number of down step of each of the teeth is preferably set to be identical to that of step of each slot of the five-phase motor 10D. This reduces the number of different types of magnetic steel sheets used to form the stator core 4B.

Figure 19:
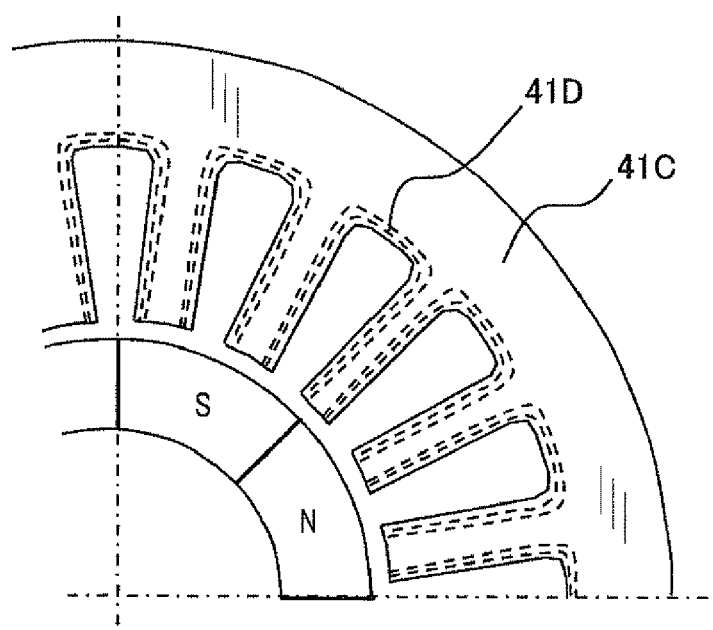
FIG. 19 is a partially lateral cross sectional view schematically illustrating the circumferential portion of each slot of the stator core illustrated in FIG. 15.

FIG. 19 schematically illustrates the circumferential portion of each slot of the stator core 4B is formed with a down three-stepped portion 41D.

In FIG. 18, two different-phase stator windings to be installed in the same slot are arranged in the circumferential direction of the stator core 4B, but can be arranged in a corresponding radial direction, or arranged obliquely relative to the circumferential direction and a corresponding radial direction.

As described above, the first and second embodiment and their modifications demonstrate compact, high-performance five-phase motors, such as five-phase motors 10, 10A, 10B, 10C, 10D and 10E; these compact, high-performance five-phase motors:

reduce intersections and/or inferences among five-phase stator windings;

allow a wire to be directly wound in the stator core to form each phase stator winding or a previously formed winding to be directly installed in the stator core to form each phase stator winding;

increase the winding space factor in each slot; and reduce the length of each end of the stator winding in the rotor's axial direction.

In the first and second embodiment and their modifications, using guiding members, such as the guiding members 25M and 25N, allows a wire to be directly wound in a corresponding pair of slots while a sufficient tensile force is applied to the wire. This winding structure allows a group of turns of each phase stator winding contained in a corresponding one slot to be aligned with each other, thus increasing the winding space factor in each slot. As a wire to be directly wound in a corresponding pair of slots, a circular wire having a substantially circular lateral cross section, a rectangular wire having a substantially rectangular lateral cross section, or the like can be used.

In the first and second embodiments and their modifications, outside the stator core, a plurality of wires can be wound to form a previously formed coil assembly consisting of five-phase stator windings, and the previously formed coil assembly can be inserted in a corresponding pair of slots to thereby produce the stator. The previously formed coil assembly can be designed to have the positional relationships among the five-phase stator windings illustrated in, for example, FIG. 3 or FIG. 15, or an alternative positional relationship thereamong. This method can produce five-phase motors each of which has: little physical interferences among the five-phase stator windings each with a high winding space factor; a short length of each end of each phase stator winding in the rotor's axial direction; and has a compact size and a high output density.

Figure 20:
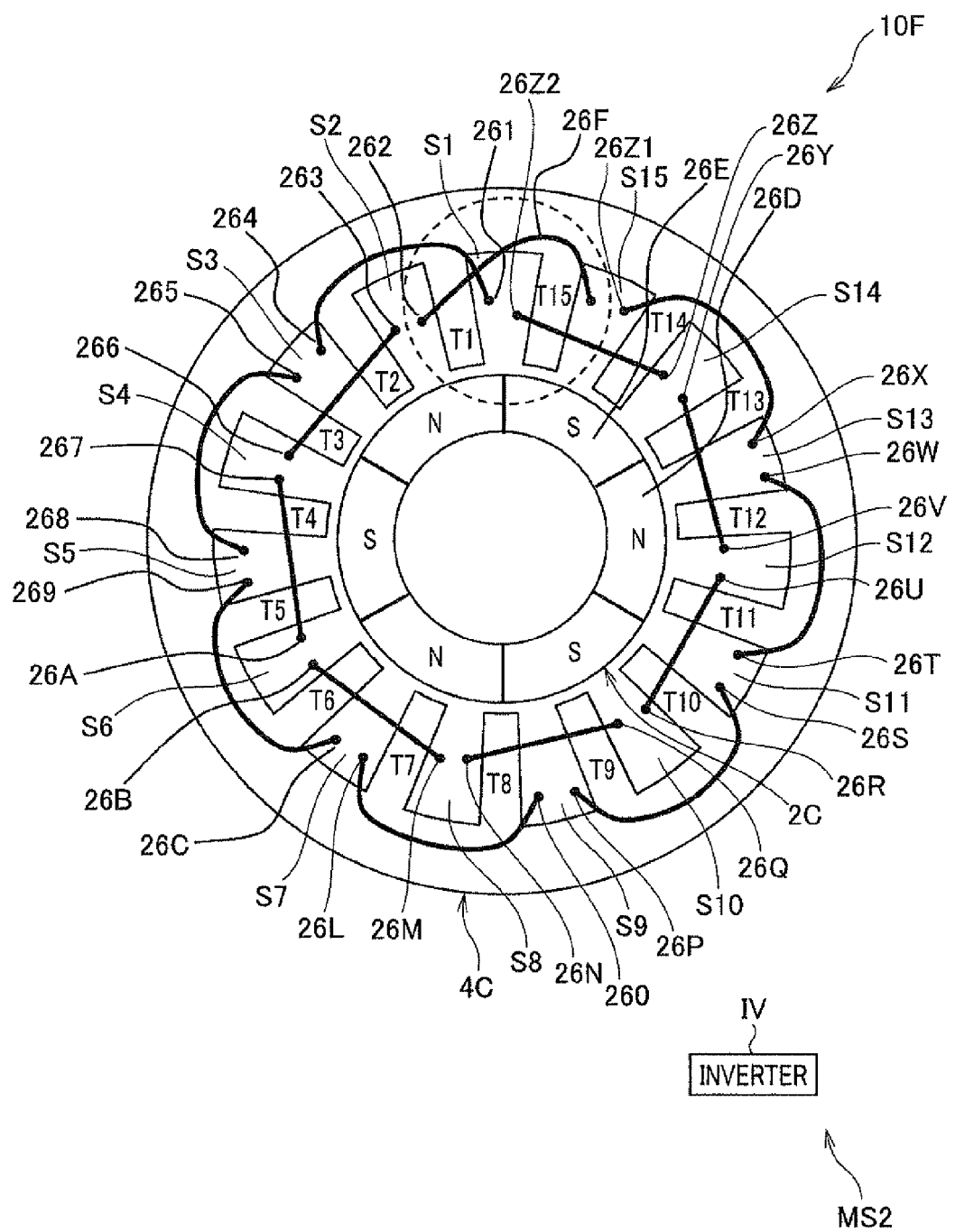
FIG. 20 is a lateral cross sectional view of a modification of the five-phase motor illustrated in FIG. 14.

FIG. 20 schematically illustrates a five-phase motor 10F designed by expanding the two-pole, five-phase motor 10C illustrated in FIG. 14 as an six-pole, five-phase motor.

The six-pole, five-phase motor 10F includes a rotor 2C and a stator core 4C. The rotor 2C has, at its outer circumferential surface, three pairs of N and S poles 26D and 26E. The three pairs of N and S poles 26D and 26E constitute the entire circumference of the rotor 2C. The N and S poles 26D and 26E are circumferentially arranged alternately at regular pitches.

The stator core 4C includes an annular back yoke 26J and fifteen teeth T1 to T15 radially inwardly projecting from the inner circumference of the back yoke 26J and circumferentially arranged at equal pitches therebetween. Each of the teeth T1 to T15 serves as a salient pole. The inner circumferential surface of each of the teeth (salient poles) T1 to T15 has a concavely circumferentially rounded shape with a curvature identical to that of the outer surface of the N and S poles 26D and 26E of the rotor 2C. Spaces between circumferentially adjacent teeth T1 to T15 provide fifteen slots S1 to S15 of the stator core 4C.

Circumferentially continuous five slots in the fifteen slots S1 to D15 are arranged within 360°; the electrical angle of 360° corresponds to two-pole pitch (one north-pole pitch or one south-pole pitch) of the rotor 2C. That is, a pitch between each pair of circumferentially continuous five slots in the twenty slots S1 to S15 is set to substantially 72° (72 electrical degrees).

A five-phase stator coil consisting of three a-phase windings (261 and 264), (26B and 26M), and (26T and 26W), three b-phase windings (263 and 266), (26L and 26O), and (26V and 26Y), three c-phase windings (265 and 268), (26O and 26Q), and (26X and 26Z1), three d-phase windings (267 and 26A), (26P and 26S), and (26Y and 26Z2), and three e-phase windings (269 and 26C), (26R and 26U), and 26F.

The a-phase winding 261 and 264 is wound in the slots S1 and S3 at a substantially two-slot pitch with a predetermined number of turns such that each end in the rotor's axial direction is located opposing the back yoke 26J. The a-phase winding 26B and 26M is wound in the slots S6 and S8 at a substantially two-slot pitch with a predetermined number of turns such that each end in the rotor's axial direction is disposed over the slot S7 between the corresponding slots S6 and S8. The a-phase winding 26T and 26W is wound in the slots S11 and S13 in the same manner as the a-phase winding 261 and 264.

Similarly, the b-phase winding 263 and 266 is wound in the slot S2 and in the slot S4 at a substantially two-slot pitch with a predetermined number of turns such that each end in the rotor's axial direction is disposed over the slot S3 between the corresponding slots S2 and S4. The b-phase winding 26L and 26O is wound in the slots S7 and S9 at a substantially two-slot pitch with a predetermined number of turns such that each end in the rotor's axial direction is located opposing the back yoke 26J. The b-phase winding 26V and 26Y is wound in the slots S12 and S14 in the same manner as the b-phase winding 263 and 266.

The c-phase winding 265 and 268 is wound in the slots S3 and S5 at a substantially two-slot pitch with a predetermined number of turns such that each end in the rotor's axial direction is located opposing the back yoke 26J. The c-phase winding 26N and 26Q is wound in the slot S8 and in the slot S10 at a substantially two-slot pitch with a predetermined number of turns such that each end in the rotor's axial direction is disposed over the slot S4 between the corresponding slots S3 and S5. The c-phase winding 26X and 26Z1 is wound in the slots S13 and S15 in the same manner as the c-phase winding 265 and 268.

The d-phase winding 267 and 26A is wound in the slots S4 and S6 at a substantially two-slot pitch with a predetermined number of turns such that each end in the rotor's axial direction is disposed over the slot S5 between the corresponding slots S4 and S6. The d-phase winding 26P and 26S is wound in the slots S9 and 511 at a substantially two-slot pitch with a predetermined number of turns such that each end in the rotor's axial direction is located opposing the back yoke 26J. The d-phase winding 26Y and 26Z2 is wound in the slots S14 and S1 in the same manner as the d-phase winding 267 and 26A.

The e-phase winding 269 and 26C is wound in the slots S5 and S7 at a substantially two-slot pitch with a predetermined number of turns such that each end in the rotor's axial direction is located opposing the back yoke 26J. The e-phase winding 26R and 26U is wound in the slots S10 and S12 at a substantially two-slot pitch with a predetermined number of turns such that each end in the rotor's axial direction is disposed over the slot S11 between the corresponding slots S10 and S12. The e-phase winding 26F is wound in the slots S15 and S2.

As well as the five-phase motor 10 according to the first embodiment, current vectors to be supplied to the slots S1 to S15 have relationships relative to each other.

Let us focus on one set of the slots S1 to S5.

Specifically, in the slot S1, a current vector of the positive a-phase current +a to be supplied to the a-phase winding 261 and a current vector of the negative d-phase current −d to be supplied to the d-phase winding 26Z2 are represented by reference numerals 131 and 132 illustrated in FIG. 2, respectively. In the slot S2, a current vector of the positive b-phase current +b to be supplied to the b-phase winding 263 and a current vector of the negative e-phase current −e to be supplied to the e-phase winding 262 are represented by reference numerals 133 and 134 illustrated in FIG. 2, respectively.

In the slot S3, a current vector of the positive c-phase current +c to be supplied to the c-phase winding 265 and a current vector of the negative a-phase current −a to be supplied to the a-phase winding 264 are represented by reference numerals 135 and 136 illustrated in FIG. 2, respectively. In the slot S4, a current vector of the positive d-phase current +d to be supplied to the d-phase winding 267 and a current vector of the negative b-phase current −b to be supplied to the b-phase winding 266 are represented by reference numerals 137 and 138 illustrated in FIG. 2, respectively.

In the slot S5, a current vector of the positive e-phase current +e to be supplied to the c-phase winding 269 and a current vector of the negative c-phase current −c to be supplied to the c-phase winding 268 are represented by reference numerals 139 and 13F illustrated in FIG. 2, respectively.

Specifically, a resultant current vector 13A of the current vectors 131 and 132 represents an A-phase current vector to be supplied to the slot S1, and a resultant current vector 1313 of the current vectors 133 and 134 represents a B-phase current vector to be supplied to the slot S2.

A resultant current vector 13C of the current vectors 135 and 136 represents a C-phase current vector to be supplied to the slot S3, and a resultant current vector 13D of the current vectors 137 and 138 represents a D-phase current vector to be supplied to the slot S4.

A resultant current vector 13E of the current vectors 139 and 13F represents an E-phase current vector to be supplied to the slot S5.

Current vectors are supplied to the remaining two sets of the slots S6 to S10 and S11 to S15 as well as to the set of the slots S1 to S5.

Like the first embodiment, the inverter IV for driving the motor 10F supplies A-, B-, C-, D-, and E-phase currents corresponding to the resultant vectors 13A, 1313, 13C, 13D, and 13E to: the slots S1, S2, S3, S4, and S5; S6, S7, S8, S9, and S10; and S11, S12, S13, S14, and S15. These A-, B-, C-, D-, and E-phase currents generate a rotating magnetic field through the respective pairs of windings, and the rotating magnetic field creates a torque. The created torque turns the rotor 2C. The five-phase motor 10F and the inverter IV provide a motor system MS2.

Because the five-phase motor 10D illustrated in FIG. 15 has an integer multiple of four poles, the different phase stator windings are symmetrically arranged in the circumferential direction.

In contrast, because the five-phase motor 10F illustrated in FIG. 20 has six poles different from an integer multiple of four poles, each end of the a-phase winding (261 and 264) in the rotor's axial direction and a corresponding end of the e-phase winding 26F in the rotor's axial direction are asymmetrically arranged in the circumferential direction relative to the remaining windings.

However, in assembling the stator of the five-phase motor 10F, the outside windings (261 and 262), (265 and 268), (269 and 26C), (26L and 26O), (26P and 26S), (26T and 26W), (26X and 26Z1), and 26F except for the winding 26F are wound first in the stator core 4C, and thereafter, the winding 26F is wound in the stator core 4C. This allows the five-phase stator windings to be wound in the stator core 4C without the five-phase stator windings being interfered with each other.

Next, a stator core assembly for the five-phase motors according to the first and second embodiments and their modifications will be described hereinafter with reference to FIG. 21.

Figure 21:
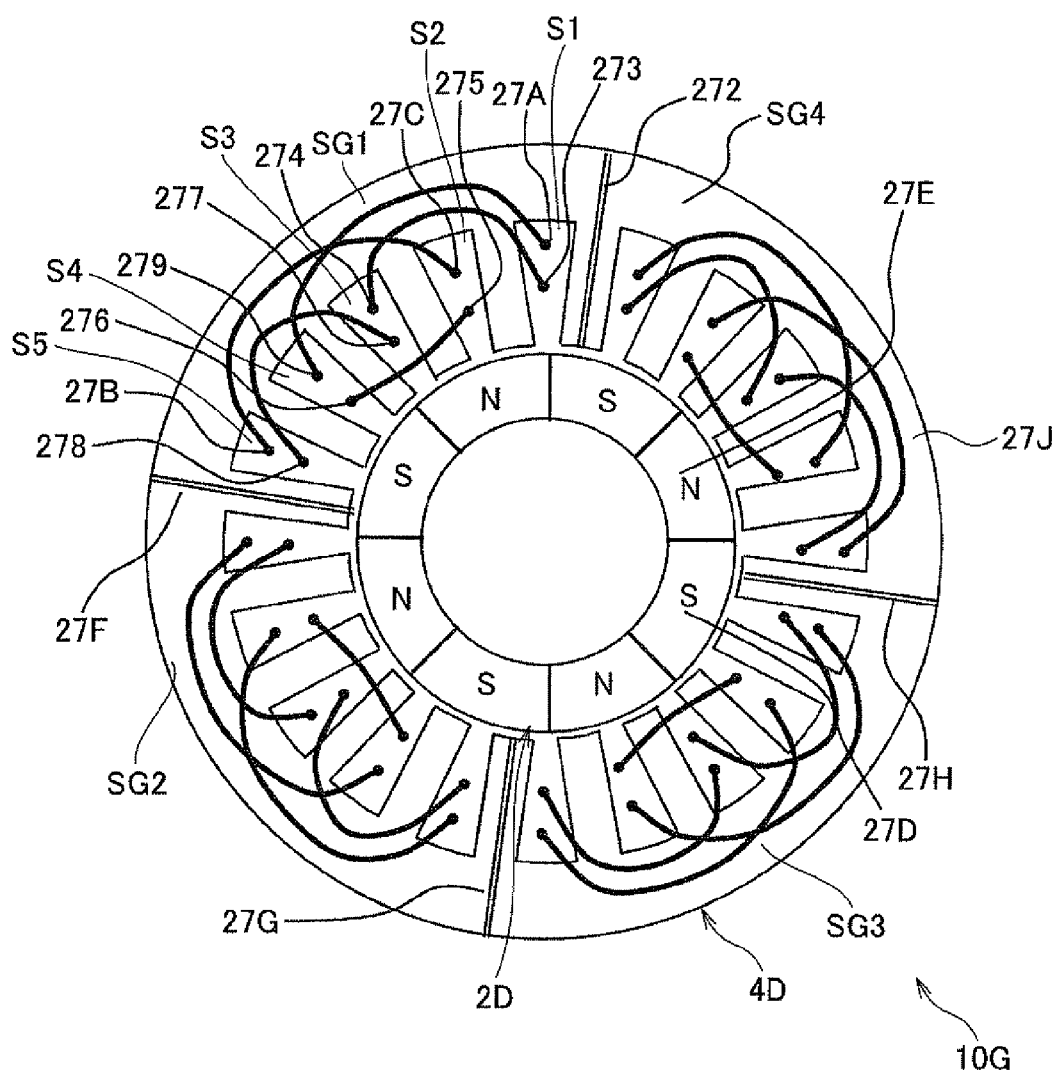
FIG. 21 is a lateral cross sectional view schematically illustrating an alternative modification of the five-phase motor illustrated in FIG. 14.

FIG. 21 schematically illustrates an eight-pole, five-phase motor 10G designed by expanding the two-pole, five-phase motor 10C illustrated in FIG. 14 as an eight-pole, five-phase motor.

The eight-pole, five-phase motor 10E includes a rotor 2G and a stator core assembly 4D. The rotor 2D having, at its outer circumferential surface, four pairs of N and S poles 27E and 27D is substantially identical to the rotor 2B illustrated in FIG. 15.

The stator core assembly 4D is made up four core segments SG1, SG2, SG3, and SG4 each having a same fan shape. Each of the four core segments SG1, SG2 SG3, and SG4 is made up of a plurality of magnetic steel sheets stacked in alignment.

The four core segments SG1, SG2, SG3, and SG4 are circumferentially aligned with one another such that each of the core segments SG1, SG2, SG3, and SG4 is joined to both adjacent core segments to thereby constitute the stator core assembly 4D. Reference characters 27F, 27G, 27H, and 272 represent divided positions among the four core segments SG1, SG2, SG3, and SG4. Each of the four core segments SG1, SG2, SG3, and SG4 corresponds to 360 electrical degrees. In other words, the stator core assembly 4D is divided by 360 electrical degrees into the four core segments SG1, SG2, SG3, and SG4.

The stator core 4D includes an annular back yoke 27J and twenty teeth radially inwardly projecting from the inner circumference of the back yoke 27J and circumferentially arranged at equal pitches therebetween.

Circumferentially continuous five slots in the twenty slots are arranged within 360°; the electrical angle of 360° corresponds to two-pole pitch (one north-pole pitch or one south-pole pitch) of the rotor 2D. That is, a pitch between each pair of circumferentially continuous five slots in the twenty slots is set to substantially 72° (72 electrical degrees).

For example, the core segment SG1 includes the slots S1 to S5 and a set of five-phase stator windings.

The a-phase winding 273 and 274 is wound in the slots S1 and S3 at a substantially two-slot pitch with a predetermined number of turns such that each end in the rotor's axial direction is located opposing the back yoke 27J. The c-phase winding 277 and 278 is wound in the slots S3 and S5 at a substantially two-slot pitch with a predetermined number of turns such that each end in the rotor's axial direction is located opposing the back yoke 27J. The b-phase winding 275 and 276 is wound in the slots S2 and S4 at a substantially two-slot pitch with a predetermined number of turns such that each end in the rotor's axial direction is disposed over the slot S3 between the corresponding slots S2 and S4.

The d-phase winding 279 and 27A is wound in the slots S4 and S2 at a substantially three-slot pitch with a predetermined number of turns such that each end in the rotor's axial direction is located opposing the back yoke 27J. The e-phase winding 27B and 27C is wound in the slots S5 and S1 at a substantially three-slot pitch with a predetermined number of turns such that each end in the rotor's axial direction is located opposing the back yoke 27J.

The winding arrangement of each of the remaining core segments SG2 to SG4 is identical to that of the core segment SG1.

Let us focus on one set of the slots S1 to S5.

Specifically, in the slot S1, a current vector of the positive a-phase current +a to be supplied to the a-phase winding 273 and a current vector of the negative d-phase current −d to be supplied to the d-phase winding 27A are represented by reference numerals 131 and 132 illustrated in FIG. 2, respectively. In the slot S2, a current vector of the positive b-phase current +b to be supplied to the b-phase winding 275 and a current vector of the negative e-phase current −e to be supplied to the e-phase winding 27C are represented by reference numerals 133 and 134 illustrated in FIG. 2, respectively.

In the slot S3, a current vector of the positive c-phase current +c to be supplied to the c-phase winding 279 and a current vector of the negative a-phase current −a to be supplied to the a-phase winding 274 are represented by reference numerals 135 and 136 illustrated in FIG. 2, respectively. In the slot S4, a current vector of the positive d-phase current +d to be supplied to the d-phase winding 277 and a current vector of the negative b-phase current −b to be supplied to the b-phase winding 276 are represented by reference numerals 137 and 138 illustrated in FIG. 2, respectively.

In the slot S5, a current vector of the positive e-phase current +e to be supplied to the e-phase winding 27B and a current vector of the negative c-phase current −c to be supplied to the c-phase winding 278 are represented by reference numerals 139 and 13F illustrated in FIG. 2, respectively.

Specifically, a resultant current vector 13A of the current vectors 131 and 132 represents an A-phase current vector to be supplied to the slot S1, and a resultant current vector 13B of the current vectors 133 and 134 represents a B-phase current vector to be supplied to the slot S2.

A resultant current vector 13C of the current vectors 135 and 136 represents a C-phase current vector to be supplied to the slot S3, and a resultant current vector 13D of the current vectors 137 and 138 represents a D-phase current vector to be supplied to the slot S4.

A resultant current vector 13E of the current vectors 139 and 13F represents an E-phase current vector to be supplied to the slot S5.

Current vectors are supplied to the remaining three sets of the slots as well as to the set of the slots S1 to S5.

In comparison to the five-phase motor 10D illustrated in FIG. 15, the five-phase windings in each of the core segments SG1 to SG4 are partially interfered with each other. However, because the five-phase windings are wound in each of the fan-shaped core segments SG1 to SG4 having a substantially 90 electrical degrees, it is possible to more facilitate the winding of each phase stator winding in each of the fans-shaped core segments SG1 to SG4 in comparison to the winding of each phase stator winding in the annular shaped stator core 4B illustrated in FIG. 15. This facilitation of the winding of each phase stator winding in each of the fans-shaped core segments SG1 to SG4 also facilitates the production of the stator coil of the five-phase motor 10G in comparison to the production of the stator coil of the five-phase motor 10D illustrated in FIG. 15.

Using guiding members, such as the guiding members 25M and 25N, allows a wire to be directly wound in a corresponding pair of slots of each of the core segments SG1 to SG4 while a given tensile force is applied to the wire. Specifically, the five-phase stator windings are wound in each of the core segments SG1 to SG4 in one of many orders. For example, the five-phase stator windings can be wound in each of the core segments SG1 to SG4 in the order from the outermost winding to the innermost winding.

Because the five-phase motor 10G illustrated in FIG. 21 is configured such that each of the four sets of five slots is arranged within 360° corresponding to two-pole pitch of the rotor 2, it is possible to facilitate the productivity of the five-phase stator windings, and reduce the length of each end of each phase stator winding in the axial direction of the rotor 2D. This facilitation and simplification makes it possible to easily manufacture the five-phase motors 10G in comparison to these conventional five-phase motors.

There are some methods of assembling the core segments SG1 to SG4 and some methods of joining circumferentially adjacent two core segments in the core segments SG1 to SG4.

For example, each of the four core segments SG1 to SG4 has both circumferential end surfaces. The four core segments SG1 to SG4 are assembled to each other such that adjacent end surfaces are joined to each other.

One end surface of one core segment can be formed with a plurality of projections and a plurality of recesses that are alternately arranged in the stack direction. One end surface of an alternative core segment is formed with a plurality of recesses and a plurality of projections that are alternately arranged in the stack direction. Each of the projections and recesses corresponds to at least one of the electromagnetic steel sheets.

The one end surface of the one core segment and the one end surface of the alternative core segment are joined to each other such that:

each of the projections of the one core segment is fitted into a corresponding one of the recesses of the alternative core segment; and each of the projections of the alternative core segment is fitted into a corresponding one of the recesses of the one core segment.

The joint method can be applied to joint other adjacent core segments to each other.

The joint method reduces a gap between circumferentially adjacent core segments in the four core segments SG1 to SG4, thus reducing mutual magnetic resistances of the circumferentially adjacent core segments to be joined. The outer circumferential portions of the assembled core segments SG1 to SG4 can be welded to each other so as to secure the practical strength of the stator core assembly 4D. The circumferentially adjacent core segments can be fixed to each other in various methods. For example, the circumferentially adjacent core segments can be fixed to each other through the housing 6 of the motor 10G.

The five-phase motor 10G made up of the stator core assembly 4D facilitates the production each core segment from electromagnetic steel sheets in comparison to the production of an annular stator core therefrom, thus improving yield of the core segments. This achieves an advantage of reducing the material costs required to produce the five-phase motor 10G in comparison to the production of a similar five-phase motor made up of an annular stator core.

In addition, the five-phase motor 10G made up of the stator core assembly 4D facilitates a number of turns of each phase stator winding in comparison to those of each phase stator winding of conventional five-phase motors.

Third Embodiment

A five-phase motor 10H according to the third embodiment of the present invention will be described hereinafter with reference to FIG. 22. Like parts between the five-phase motors according to the first and third embodiments, to which like reference characters are assigned, are omitted or simplified in description.

The five-phase motor 10H is designed as an eight-pole dual motor. To such dual motors, various structures can be applied. The five-phase motor (eight-pole dual motor) 10H is made up of one example of the various structures.

Specifically, the five-phase motor 10H includes a first rotor RO1, a first stator ST1, a second rotor RO2, and a second stator ST2.

The first rotor RO1 is comprised of a substantially annular back yoke 289 and, at its outer circumferential surface, four pairs of N and S poles 287 and 288 substantially identical to the rotor 2B illustrated in FIG. 15. The first rotor RO1 is coaxially mounted on the output shaft 1.

The first stator ST1 is made up of an annular back yoke and 20 teeth 282. The teeth 282 project radially inwardly from the inner circumference of the back yoke and are circumferentially arranged at equal pitches therebetween. Each of the teeth 282 serves as a salient pole. Spaces between circumferentially adjacent teeth 282 provide 20 slots of the first stator ST1.

The first stator ST1 is arranged such that its center axis is coaxial to the center axis of the first rotor RO1 and its inner circumference is opposite to the outer circumference of the first rotor RO1 with an air gap therebetween.

The second stator ST2 is made up of an annular back yoke and 20 teeth 281. The teeth 281 project radially outwardly from the outer circumference of the back yoke and are circumferentially arranged at equal pitches therebetween. Each of the teeth 281 serves as a salient pole. Spaces between circumferentially adjacent teeth provide 20 slots of the second stator ST2.

The second stator ST2 is arranged such that:

its center axis is coaxial to the center axis of the first rotor RO1;

its inner circumference is opposite to the outer circumference of the first stator ST1; and each of the slots of the second stator ST2 is radially aligned with a corresponding one of the slots of the first stator ST1.

The inner circumference of the second stator ST2 is joined to the outer circumference of the first stator core ST1 to provide a common back yoke (common stator core 283). The inner circumference of the second stator ST2 can be separated, with a gap, from the outer circumference of the first stator core ST1 to provide a common back yoke (common stator core 283).

The second rotor RO2 is comprised of a substantially annular shaped back yoke 286 and, at its inner circumferential surface, four pairs of N and S poles 284 and 285 substantially identical to the rotor 2B illustrated in FIG. 15. The second rotor RO2 is arranged such that its center axis is coaxial to the center axis of the first rotor RO1 and the inner circumference of each salient pole of the second rotor RO2 is opposite to the outer circumference of the second stator ST2 with an air gap therebetween.

Specifically, a first motor consisting of the first rotor RO1 and the first stator ST1 and a second motor consisting of the second rotor RO2 and the second stator ST2 are concentrically combined to each other. The first rotor RO1 and the first stator ST1 electromagnetically act so as to generate a first torque, and the second rotor RO2 and the second stator ST2 electromagnetically act so as to generate a second torque.

Assuming that the number (8) of the poles of the first rotor RO1 is set to N1 (N1 is an even number equal to or greater than 2), a total number (20) of the slots of the first stator ST1 is set to the product of 5/2 and the number N1 (8). Similarly, assuming that the number (8) of the poles of the second rotor RO2 is set to N2 (N2 is an even number equal to or greater than 2), a total number (20) of the slots of the second stator ST2 is set to the product of 5/2 and the number N2 (8).

Because each slot of the stator core of the first motor and a corresponding slot of the second core of the second motor is radially aligned, a winding can be easily wound in the radially aligned slots of the first and second cores. As each of five-phase stator windings, a toroidal winding can be used. This toroidal winding facilitates the winding of each phase stator winding and reduces each end of each of the five-phase stator windings in the rotor's axial direction, thus simplifying the structure of the five-phase motor 10H. The radial thickness of the second rotor RO2 is preferably set to be minimized; this minimization allows diameter of the second rotor RO2 to be increased as much as possible so as to increase the second torque.

Reference character 28A represents an A-phase winding wound around a corresponding portion of the stator core 283 between corresponding radially aligned slots so as to be installed in the corresponding radially aligned slots. Reference character 28F corresponds to the resultant current vector 13A illustrated in FIG. 2, and reference character 28G corresponds to a negative resultant current vector 13A.

Similarly, reference character 28B represents a B-phase winding wound around a corresponding portion of the stator core 283 between corresponding radially aligned slots so as to be installed in the corresponding radially aligned slots. Reference character 28C represents a C-phase winding wound around a corresponding portion of the stator core 283 between corresponding radially aligned slots so as to be installed in the corresponding radially aligned slots.

Reference character 28D represents a D-phase winding wound around a corresponding portion of the stator core 283 between corresponding radially aligned slots so as to be installed in the corresponding radially aligned slots. Reference character 28E represents an E-phase winding wound around a corresponding portion of the stator core 283 between corresponding radially aligned slots so as to be installed in the corresponding radially aligned slots.

Specifically, as well as the five-phase motor 10D illustrated in FIG. 15, circumferentially continuous five slots in the twenty slots of the five-phase motor 10H are arranged within 360°; the electrical angle of 360° corresponds to two-pole pitch (one north-pole pitch or one south-pole pitch) of the rotor 2A. That is, a pitch between each pair of circumferentially continuous five slots in the twenty slots is set to substantially 72° (72 electrical degrees).

That is, the five-phase stator windings 28A, 28B, 28C, 28D, and 28E are arranged within the angular range of 360 electrical degrees corresponding to two-pole pitch (one north-pole pitch or one south-pole pitch) of each of the first and second rotors RO1 and R02. This configuration reduces the number of slots within 360° of the five-phase motor 10H in comparison to the number of corresponding slots within 360° of conventional five phase motors, examples of which are illustrated in FIGS. 31 and 32. This facilitates the productivity of the five-phase stator windings, and reduces the length of each end of each phase stator winding in the rotor's axial direction, thus simplifying the structure of the five-phase motor 10H. This facilitation and simplification makes it possible to easily manufacture the five-phase motors 10H in comparison to these conventional five-phase motors.

As well as the first and second embodiments and their modifications, the five-phase motor 10H achieves output-torque characteristics with little torque ripples.

Next, electromagnetic actions of the five-phase motor 10H will be described hereinafter.

Figure 22:
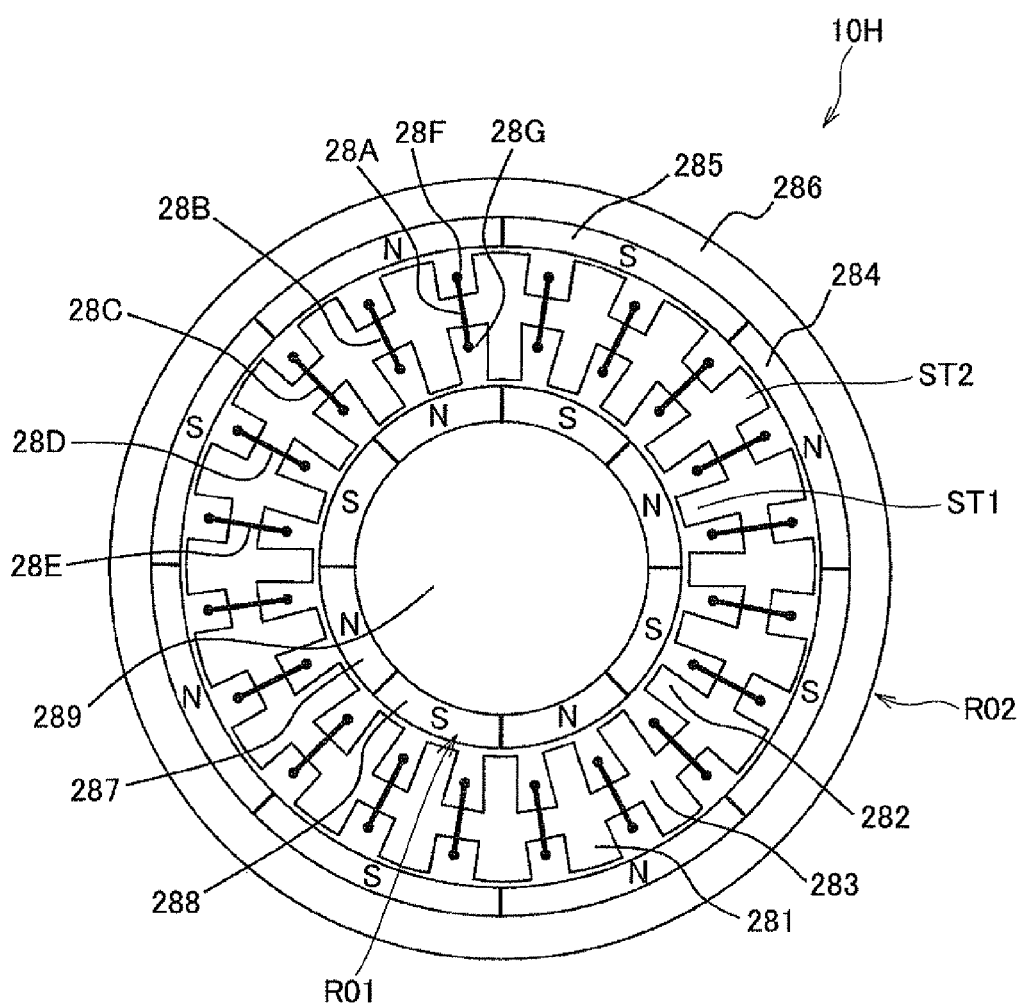
FIG. 22 is a lateral cross sectional view schematically illustrating a five-phase motor according to the third embodiment of the present invention.

When an A-phase current flows through the winding 28F in a positive direction into the paper of FIG. 22, because the N pole 284 of the second rotor RO2 faces the winding 28F, a torque is created in the second rotor RO2 in clockwise direction based on the Fleming's left-hand rule.

Because the winding 28G is wound around the stator core 283 together with the winding 28F, the A-phase current flows through the winding 28G in a negative direction out of the paper of FIG. 22, Because the N pole 284 of the first rotor RO1 faces the winding 28G, a torque is created in the first rotor RO1 in clockwise direction based on the Fleming's left-hand rule.

Thus, when the winding arrangement illustrated in FIG. 22 is used, the five-phase motor 10H is configured such that the N and S pole arrangement of the first rotor RO1 and that of the second rotor RO2 are identical to each other and a current flowing through one of the radially aligned slots is opposite in direction from that flowing through the other of the radially aligned slots. This configuration generates the first torque and the second torque in the same clockwise direction.

Figure 23:
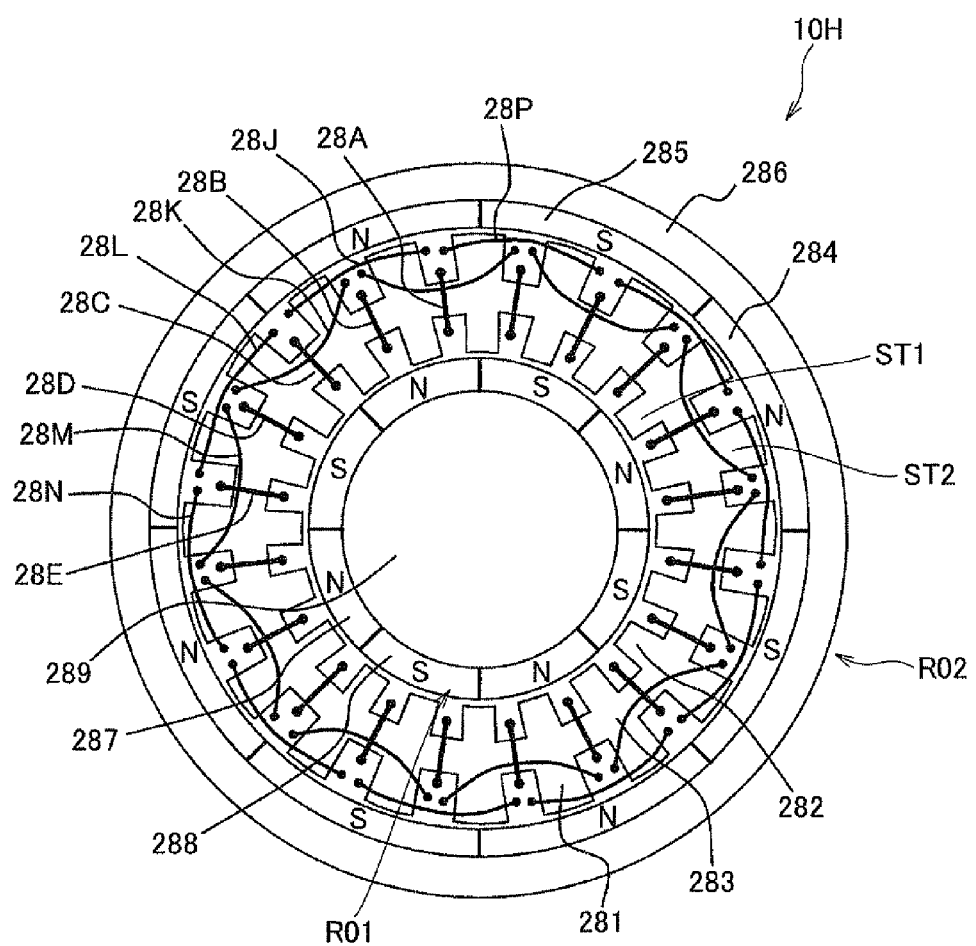
FIG. 23 is a lateral cross sectional view schematically illustrating a modification of the five-phase motor illustrated in FIG. 22.

Next, FIG. 23 represents a modification of the five-phase motor 10E in order to adjust the amount of current flowing through the slots of the second stator ST2 relative to the amount of current flowing through the slots of the first stator ST1.

Because the cross section of each slot of the second stator ST2 is larger than that of a corresponding slot of the first stator ST1, a plurality of windings are additionally provided in the second stator ST2; reference characters 28J, 28K, 28L, 28M, 28N, and 28P are assigned to some of these windings.

A current vector of an a-phase current supplied to flow through the winding 28J corresponds to the current vector 131 illustrated in FIG. 2, and a current vector of a b-phase current supplied to flow through the winding 28K corresponds to the current vector 133 illustrated in FIG. 2.

A current vector of a c-phase current supplied to flow through the winding 28L corresponds to the current vector 135 illustrated in FIG. 2, and a current vector of a d-phase current supplied to flow through the winding 28M corresponds to the current vector 137 illustrated in FIG. 2. A current vector of an e-phase current supplied to flow through the winding 28N corresponds to the current vector 139 illustrated in FIG. 2. The remaining additional windings are wound in the same manner as the windings 28J to 28N. Finally, the winding 28P is wound; a current vector of an a-phase current supplied to flow through the winding 28P corresponds to the current vector 131 illustrated in FIG. 2.

Specifically, two additional windings are wound in each slot of the second stator ST2. The phase of the resultant current vector of the current vectors flowing in the two additional windings is set to be identical or close to that of the winding wound in each slot.

These additional windings increase the amplitude of the resultant current vector corresponding to the sum of currents flowing through each slot. For example, the current vector flowing in a slot of the second stator ST2 in which the winding 28A is wound can be made up of a current vector 131 flowing in one additional winding in the slot and a current vector 132 flowing in the other additional winding in the slot (see FIG. 2). This achieves the A-phase current vector 13A illustrated in FIG. 2.

The shape of each slot, the shape of each winding, and/or the shape of each insulating paper in each of the five-phase motors 10H illustrated in FIGS. 22 and 23 can be designed as those illustrated in FIGS. 16, 17, 18, and 19, respectively.

The circumferential positions of the slots of the second stator ST2 and those of the slots of the first stator ST1 can be shifted in the circumferential direction. Another winding method different from the winding method illustrated in FIGS. 22 and 23 can be used.

In each of the first, second, and third embodiments and their modifications, the rotor is designed as a surface-magnet rotor, but the present invention is not limited thereto. One rotor can be selected form various rotors according to the desired application of the five-phase motor and/or the motor characteristics.

Figure 24:
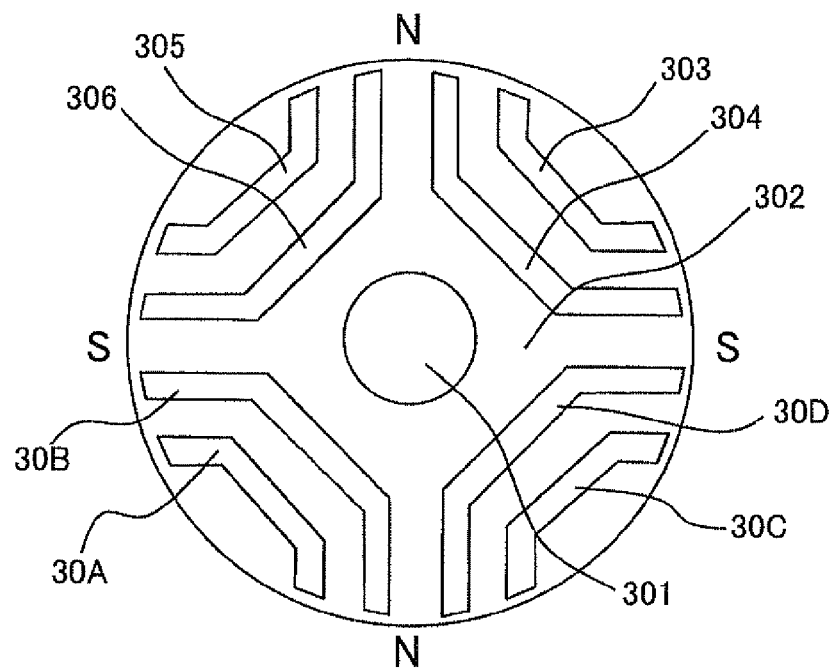
FIG. 24 is a lateral cross sectional view of an alternative example of the rotor usable in the first to third embodiment and their modifications.
Figure 25:
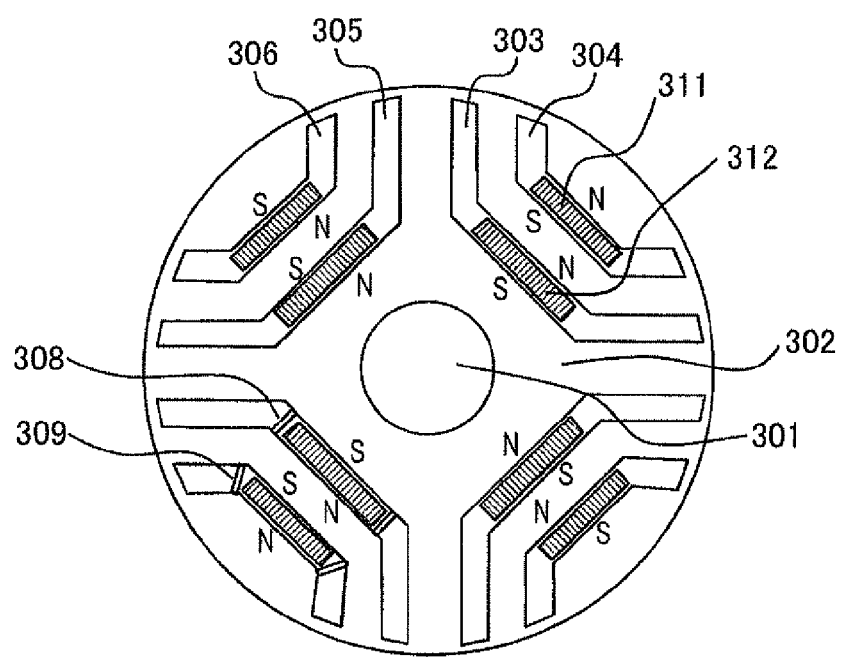
FIG. 25 is a lateral cross sectional view of a modification of the rotor illustrated in FIG. 24.

Specifically, a multi-flux-barrier rotor illustrated in FIG. 24 can be used as the rotor of each of the five-phase motors according to the first, second, and third embodiments and their modifications. In such a multi-flux-barrier rotor, the shape of each slit can be freely designed to achieve a desired flux distribution in the rotor.

The multi-flux-barrier rotor illustrated in FIG. 24 is made up of a soft magnetic material rotor core, such as a magnetic silicon steel sheet rotor, 302 with four salient poles N and S circumferentially arranged at equal pitches therebetween.

The rotor is also made up of four groups of chordal flux barriers (slits) (306, 305), (304, 303), (30B, 30A), and (30D, 30C) in its axial direction each punched out in slit by, for example, press working.

The four groups of chordal flux barriers (306, 305), (304, 303), (30B, 30A), and (30D, 30C) are symmetrically arranged with respect to the axial direction of the output shaft 301 corresponding to the output shaft 1 illustrated in FIG. 1A such that:

each of the four groups of the flux barriers (306, 305), (304, 303), (30B, 30A), and (30D, 30C) is circumferentially spaced apart from another group;

the flux barriers of each of four groups are aligned in a corresponding radial direction of the rotor core at intervals therebetween; and both ends of each flux barrier of the four groups extend toward a corresponding one of the salient poles with predetermined thin edges thereof left between the both ends and the outer periphery.

The rotor illustrated in FIG. 24 is designed such that the number of slits of the rotor illustrated in FIG. 24 corresponds to four layers, but elimination of the slits 306 and 30D allows the number of slits of the rotor to correspond to three layers, and further elimination of the slits 304 and 30B allows the number of slits of the rotor to correspond to two layers. The more detailed torque characteristics can be achieved with increase in the number of layers of the rotor.

In the rotor illustrated in FIG. 24, the electromagnetic steel portion and the slits can be reversed to each other. In this modification, reference characters 303, 304, 305, 306, 30A, 30B, 30C, and 30D represent the electromagnetic steel portion, and the remaining portion in the rotor core is made of a non-magnetic material. This modification can achieve electromagnetic characteristics similar to those of the rotor illustrated in FIG. 24. That is, the number of magnetic paths in the rotor according to the modification is equal to that of magnetic paths in the rotor illustrated in FIG. 24.

In the rotor illustrated in FIG. 24, a direst axis (d-axis) is determined in a direction of magnetic flux created by a N pole, and a quadrature axis (q-axis) is determined such that its phase is $\pi/2$ radian electric angle leading with respect to a corresponding d-axis during rotation of the rotor. In other words, the q-axis is electromagnetically orthogonal to the d-axis.

In order to obtain an output torque T, it is necessary that the electromagnetic resistance in the d-axis direction is lower than that in the q-axis direction; this means that a d-axis inductance Ld of the rotor in the d-axis direction is lower than a q-axis inductance Lq of the rotor in the q-axis direction. The output torque T is given by the following equation:

$$T=Pn\times(Ld-Lq)\times id\times iq$$

where Pn represents the number of pole pair, that is, the half of the number of poles of the motor, id represents a current component to create a magnetomotive force in the d-axis direction, and iq represents a current component to create a magnetomotive force in the q-axis direction.

The rotor illustrated in FIG. 24 has an advantage of reducing its production cost in comparison to rotors equipped with expensive permanent magnets. In addition, because the field magnetic flux can be adjusted by the d-axis current component id, the motor using the rotor illustrated in FIG. 24 can be driven under field weakening control and constant torque control. The number of slits and the arrangement of them can be optimally designed in order to change harmonic voltage components in the input of the motor using the rotor illustrated in FIG. 24; this can reduce, in design, torque ripples, oscillations, and noise.

As a modification of the rotor illustrated in FIG. 24, permanent magnets 311 and 312 can be disposed in each of the four groups of slits (306, 305), (304, 303), (30B, 30A), and (30D, 30C) so as to increase the output torque T. The d-axis current component id acts to increase the output torque T. Reference characters 308 and 309 disposed in the slits 308 and 30A represent bridges to maintain the rotor strength at a high level.

Figure 26:
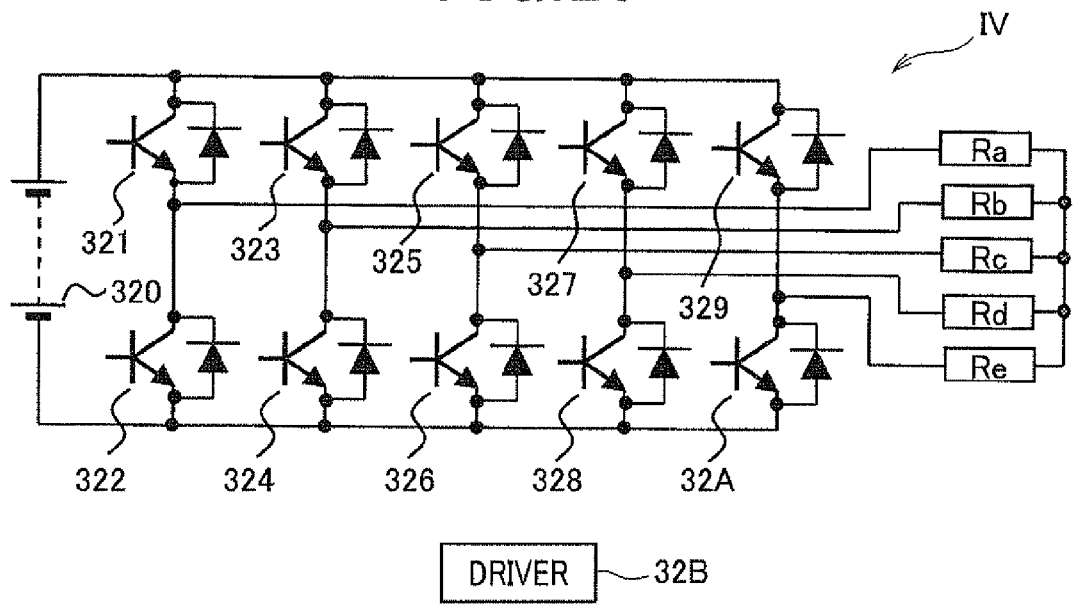
FIG. 26 is a circuit diagram schematically illustrating an example of an inverter usable in the first to third embodiment and their modifications.

An example of the structure of the inverter IV for driving each of the five-phase motors, for example, the five-phase motor 10 illustrated in FIG. 1B is illustrated in FIG. 26. In FIG. 26, reference characters Ra, Rb, Re, Rd, and Re represent the a-, b-, c-, d-, and e-phase windings, respectively.

The inverter IV is provided with a DC battery 320, a first pair of series-connected power transistors 321 and 322, a second pair of series-connected power transistors 323 and 324, a third pair of series-connected power transistors 325 and 326, a fourth pair of series-connected power transistors 327 and 328, a fifth pair of series-connected power transistors 329 and 32A. As power transistors, bipolar transistors are for example used.

Specifically, the emitter of each of the high-side transistors 321, 323, 325, 327, and 329 is commonly connected to one end of a corresponding one phase winding, and the collector thereof is commonly connected to a positive terminal of the battery 320. The collector of each of the low-side transistors 322, 324, 326, 327, and 32A is connected to the emitter of a corresponding one of the high-side transistors 321, 323, 325, 327, and 329, and the emitter thereof is commonly connected to a negative terminal of the battery 320.

A diode is connected in antiparallel to each power transistor.

The inverter IV illustrated in FIG. 26 is provided with a driver 32B. The driver 32B made up of, for example, a microcomputer and its peripheries is connected to the base of each power transistor.

Specifically, the driver 32B of the inverter individually drives each of the power transistors 321, 322, 323, 324, 325, 326, 327, 328, 329, and 32A in a corresponding duty cycle (on and off durations) to thereby generate, based on a DC voltage of the battery 320, a desirable waveform average voltage for each phase, such as a pseudo sinusoidal voltage for each phase.

The five-phase pseudo sinusoidal voltages are applied to the respective a-, b-, c-, d-, and e-phase windings Ra, Rb, Rc, Rd, and Re, respectively, so that five-phase pseudo sinusoidal voltages with a phase difference of 72 electrical degrees between each other are supplied to the slots S1, S2, S3, S4, and S5 as the resultant vectors 13A, 13B, 13C, 13D, and 13E, respectively.

For example, when the number of turns of each phase winding is Nx, the amplitude Amp of the resultant current vector 13A formed by an a-phase current Ia whose vector is represented as 131 and Id represents a d-phase current whose vector is represented as 132 illustrated in FIG. 2 is expressed by: "Amp=(Ia−Id)×Nx×cos 18°".

This current application generates a rotating field. The rotating field turns the rotor 2 based on magnetic actions between the rotating field and the N and S poles 11B and 11C.

Figure 27A:
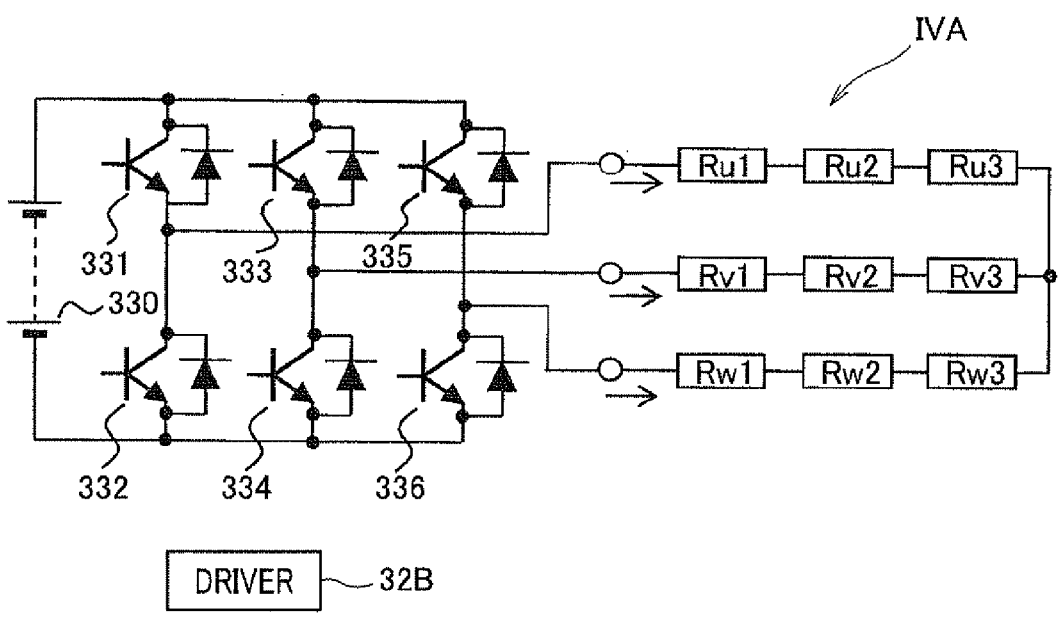
FIG. 27A is a circuit diagram schematically illustrating an alternative example of the inverter usable in the first to third embodiment and their modifications.

An alternative example of the structure of the inverter IV for driving each of the five-phase motors, for example, the five-phase motor 10 illustrated in FIG. 1B is illustrated in FIG. 27A. The inverter IVA illustrated in FIG. 27 is designed as a three-phase inverter.

In FIG. 27A, reference characters Ru1, Ru2, and Ru3 represent windings to which a U-phase current Iu is supplied, reference characters Rv1, Rv2, and Rv3 represent windings to which a V-phase current Iv is supplied, and reference characters Rw1, Rw2, and Rw3 represent windings to which a W-phase current Iw is supplied.

A selected number of turns of at least one of the three-phase windings Ru1, Ru2, Ru3, Rv1, Rv2, Rv3, and Rw1, Rw2, and Rw3 is wound in each of the five slots S1 to S5 so that the resultant current vector of each slot is determined to be a desired current vector. The number of the three-phase windings and the number of turns of each of the three-phase windings can be determined according to the motor specifications to be achieved.

Specifically, in order to drive the five-phase motor 10 illustrated in FIG. 1 by the three-phase inverter illustrated in FIG. 27A, the product of the current and the number of turns of corresponding phase windings in each slot is required to be substantially equal to the product of a corresponding one of the three-phase currents Iu, Iv, and Iw and the number of turns of a corresponding at least one of the U-, V-, and W-phase windings.

For example, let us focus the slot S1. When the A-phase current (Ia−Id) is synchronized with the U-phase current Iu, and the number of turns of the winding Ru1 is set to Ny, the number of turns of the winding Ru1 is determined to meet the following equation:

$$Iu \times Ny = (Ia-Id) \times Nx \times \cos 18°$$

The winding Ru1 having the number Ny of turns is arranged in the slot S1. At that time, the other end of the winding Ru1 is designed to be wound in another slot.

Because given current amplitude and phase can be theoretically determined according to: selected two-phase currents to be supplied to corresponding two-phase windings; and a selected number of each of the two-phase windings, the number of at least one of the three-phase windings to which the three-phase currents Iu, Iv, and Iw are supplied for each slot can be designed so as to simplify the stator coil of the stator.

Figure 27B:
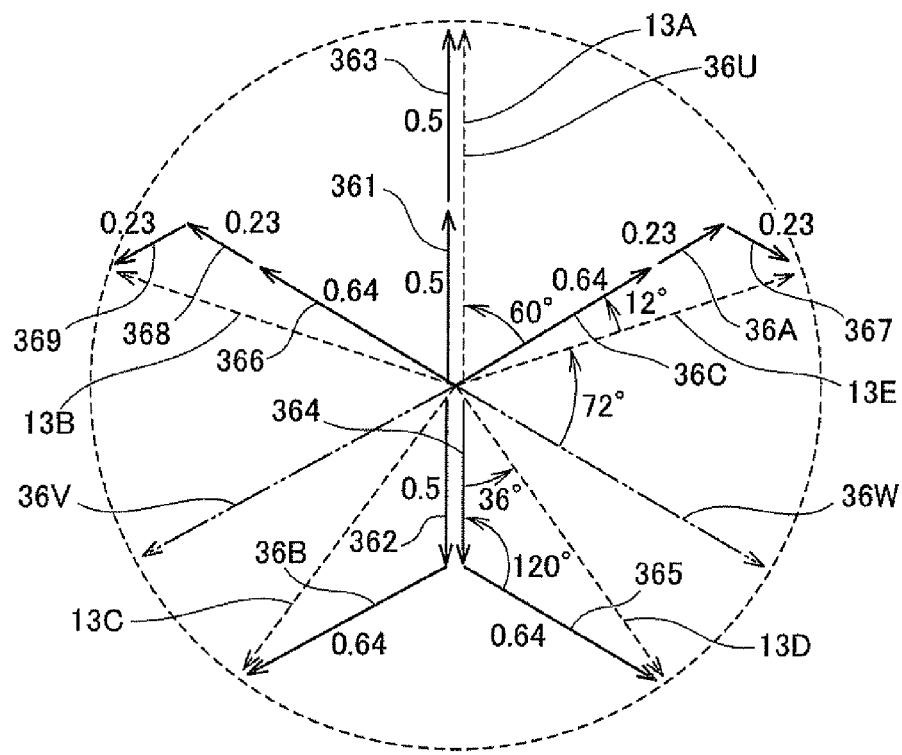
FIG. 27B is a vector diagram schematically illustrating current vectors of five-phase currents supplied by the inverter illustrated in FIG. 27A.

FIG. 27B schematically illustrates three-phase and five-phase current vectors in order to drive the five-phase motor 10 by the three-phase inverter WA illustrated in FIG. 27A.

As well as FIG. 2, reference characters 13A, 13B, 13C, 13D, and 13E represent the A-phase current vector, B-phase current vector, C-phase current vector, the D-phase current vector, and the E-phase current vector, respectively. The five-phase current vectors have a phase difference of 72 electrical degrees between each other. Sinusoidal three-phase current vectors as balanced three-phase currents are defined. Reference characters 36U, 36V, and 36W represent U-, V-, and W-phase current vectors, respectively. The U-, V-, and W-phase currents have a phase difference of 120 electrical degrees between each other.

Other current vectors 361, 362, 363, 364, 365, 366, 367, 368, 369, 36A, 3613, and 36C represent at least one of the three-phase current vectors to be supplied to a corresponding at least one of the three-phase windings that should be wound in each slot. The direction of each of the other current vectors is in agreement with or opposite to that of a corresponding one of the U-, V-, and W-phase current vectors, and the magnitude of each other current vector is represented as the ratio to a unit circle; this ratio is expressed by decimal.

Figure 27C:
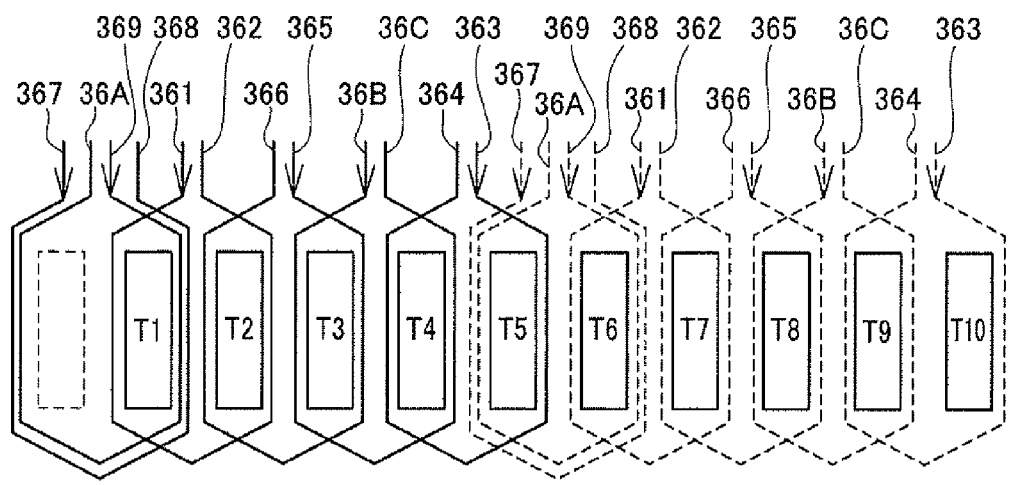
FIG. 27C is a develop view of the arrangement of the teeth of the stator core of the five-phase motor illustrated in FIG. 3 in the counterclockwise direction from the left to right of the paper of FIG. 27C.

FIG. 27C is a develop view of the arrangement of the teeth of the stator core 4A of the five-phase motor 10A in the counterclockwise direction from the left to right of the paper of FIG. 27C; this FIG. 27C shows, within 720 electrical degrees, the three-phase windings 361, 362, 363, 364, 365, 366, 367, 368, 369, 36A, 36B, and 36C corresponding to the current vectors illustrated in FIG. 27B, and the direction of current to be supplied to each of the three-phase windings.

The A-phase current vector 13A is made up of U-phase current vectors 361 and 363 corresponding to the U-phase windings 361 and 363 to which the U-phase current is supplied. The winding 361 is connected via one end side of the stator core 4A to the winding 362 forming the C-phase current vector. The winding 363 is connected via one end side of the stator core 4A to the winding 364 forming the D-phase current vector.

The remaining current component of the C-phase current vector is the current vector 36B corresponding to the V-phase winding 3613 to which the V-phase current is supplied. The winding 36B is connected via one end side of the stator core 4A to the winding 36C forming the E-phase current vector.

The remaining current component of the D-phase current vector is the current vector 365 corresponding to the W-phase winding 365 to which the W-phase current is supplied. The winding 365 is connected via one end side of the stator core 4A to the winding 366 forming the B-phase current vector.

The remaining current component of the B-phase current vector is the current vectors 369 and 368 corresponding to the V-phase winding 369 to which the V-phase current is supplied. The winding 369 is connected via one end side of the stator core 4A to the winding 36A forming the E-phase current vector.

The remaining current component of the E-phase current vector is the current vector 367 corresponding to the W-phase winding 367 to which the W-phase current is supplied. The winding 367 is connected via one end side of the stator core 4A to the winding 368 forming the B-phase current vector.

The winding arrangement illustrated in FIG. 27C allows the five-phase motor 10A illustrated in FIG. 3 to be driven by the three-phase inverter illustrated in FIG. 27A. In FIG. 27C, six windings are installed within 360 electrical degrees of the stator core 4A in comparison to five windings installed within 360 electrical degrees thereof. However, because the structure of the three-phase inverter illustrated in FIG. 27A is more simplified and general in comparison to the inverter illustrated in FIG. 26, making it possible to reduce the total cost of the motor system equipped with one of the five-phase motors set forth above and the three-phase inverter illustrated in FIG. 27A in comparison to the motor system equipped with one of the five-phase motors set forth above and the inverter illustrated in FIG. 26.

In FIGS. 27A to 27C, the three-phase current Iu, Iv, and Iw need not be three-phase balanced sinusoidal currents. Within the limitation that meets the equation "Iu+Iv+Iw=O", the phase and/or the amplitude of each of the three-phase current Iu, Iv, and Iw can be changed. The magnitude of the three-phase currents and that of three-phase voltages corresponding to the three-phase currents can be obtained so as to match the total power of the three-phase inverter with that of the five-phase inverter illustrated in FIG. 26. In FIGS. 27A to 27C, the number of each of U-, V-, and W-phase windings is set to three, but the number of each of U-, V-, and W-phase windings can be increased or reduced according to need, It follows from what has been described above each of the five-phase motors according to the first to third embodiments and their modifications has functions of easily reducing harmonic voltage components so as to achieve the output-torque characteristics with little torque ripples in comparison to conventional three-phase converters;

more simplifying the winding structure in comparison to conventional five-phase motors;

facilitating its productivity;

reducing the length of each end of each phase stator winding in the rotor's axial direction;

increasing the winding space factor in each slot; and allowing it to be driven by normal three-phase inverters.

Various embodiments and their modifications have been described in the specification, but further modifications and deformations can be applied to the above-mentioned embodiments and their modifications.

Various configurations and shapes of rotors can be included within the scope of the present invention, and various torque-ripple reduction techniques can be applied to the present invention.

For example, the present invention can be applied to various rotors, such as interior magnet rotors, reluctance rotors, or rotors for induction motors. The shape of each of the stator poles and the rotor poles can be smoothed in the circumferential direction of the rotor, and some of the rotor poles can be shifted in the circumferential direction so as to cancel out torque ripple components.

The five-phase motors according to the first to third embodiments and their modifications can be further modified as outer rotor five-phase motors with cylindrical air gaps, axial-gap five-phase motors with disc air gaps, or liner five-phase motors. The five-phase motors according to the first to third embodiments and their modifications can be further modified such that their air gaps are slightly tapered. Some of the five-phase motors according to the first to third embodiments and their modifications can be combined with each other as dual motors. A part of the five-phase motors according to the first to third embodiments and their modifications can be eliminated.

As soft magnetic materials by which the rotors and stators of the five-phase motors according to the first to third embodiments and their modifications are produced, amorphous electromagnetic steel sheets or powder magnetic cores can be used in place of the electromagnetic silicon steel sheets. The powder magnetic cores can be formed by compressing insulator-coated soft-magnetic powder.

Particularly, in tiny motors, an electromagnetic steel sheet can be punched out, folded, and/or molded to produce three-dimensionally shaped parts to be used as a part of the five-phase motors according to the first to third embodiments and their modifications.

The power transistors can be removed with power elements, such as thyristors or power elements to which new technologies, such as SiC or GaN technologies are applied. Currents to be applied to each phase stator winding can have various waveforms except for the sinusoidal wave set forth above.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. A five-phase motor including A, B, C, D, and E phases, the five-phase motor comprising: a rotor with a number of poles; and a stator including: a stator core provided with a plurality of slots therein, and five pair of windings; the number of the poles of the rotor is an integer multiple of four; five slots in the plurality of slots are arranged within circumferential 360 electrical degrees of the stator; the five pairs of windings are arranged such that each of the windings is wound in two slots, the two slots being separated by two-slot pitches, and slots S1 to S12 in the plurality of slots are circumferentially arranged in order of the slots S1 to S12, wherein the five-phase motor is configured such that:

the five pairs of windings comprise a pair of a first a-phase winding and a second a-phase winding, a pair of a first b-phase winding and a second b-phase winding, a pair of a first c-phase winding and a second c-phase winding, a pair of a first d-phase winding and a second d-phase winding, and a pair of a first e-phase winding and a second e-phase winding;

the first a-phase winding is wound in the slot S1 as an A-phase slot and in the slot S3 as a C-phase slot separated by a two-slot pitch while passing through an outer diameter side of the stator core at one end of the rotor in an axial direction of the rotor;

the first c-phase winding is wound in the C-phase slot S3 and in the slot S5 as an E-phase slot separated by a two-slot pitch while passing through an outer diameter side of the stator core at one end of the rotor in the axial direction of the rotor;

the first e-phase winding is wound in the E-phase slot S5 and in the slot S7 as a B-phase slot separated by a two-slot pitch while passing through an outer diameter side of the stator core at one end of the rotor in the axial direction of the rotor;

the first b-phase winding is wound in the B-phase slot S7 and in the slot S9 as a D-phase slot separated by a two-slot pitch while passing through an outer diameter side of the stator core at one end of the rotor in the axial direction of the rotor;

the first d-phase winding is wound in the D-phase slot S9 and in the slot S11 as an A-phase slot separated by a two-slot pitch while passing through an outer diameter side of the stator core at one end of the rotor in the axial direction of the rotor;

the second b-phase winding is wound in the slot S2 as a B-phase slot and in the slot S4 as a D-phase slot separated by a two-slot pitch while covering one end of the C-phase slot S3 in the rotor axial direction so that a coil end portion of the second b-phase winding is reduced in length;

the second d-phase winding is wound in the D-phase slot S4 and in the slot S6 as an A-phase slot separated by a two-slot pitch while covering one end of the E-phase slot S5 in the rotor axial direction so that a coil end portion of the second d-phase winding is reduced in length;

the second a-phase winding is wound in the A-phase slot S6 and in the slot S8 as a C-phase slot separated by two slots while covering one end of the B-phase slot S7 in the rotor axial direction so that a coil end portion of the second a-phase winding is reduced in length;

the second c-phase winding is wound in the C-phase slot S8 and in the slot S10 as an E-phase slot separated by two slots while covering one end of the D-phase slot S9 in the rotor axial direction so that a coil end portion of the second c-phase winding is reduced in length;

the second e-phase winding is wound in the E-phase slot S10 and in the slot S12 as a B-phase slot separated by two slots while covering one end of the A-phase slot S11 in the rotor axial direction so that a coil end portion of the second e-phase winding is reduced in length; and the slot S11 is the slot S1 and the slot S12 is the slot S2 when the number of the poles is four.

2. The five-phase motor according to claim 1, wherein each of the slots gradually expands toward a back yoke of the stator core at a portion thereof close to one axial end of the stator core while being bent toward a periphery of the stator core so that a physical interference between each winding wound in a corresponding slot and the stator core, the five-phase motor further comprising:

an insulating member ZZ1 located in a slot in the plurality of slots; and an insulating member ZZ2 located close to an axial end of the corresponding slot, the insulating members ZZ1 and ZZ2 are overlapped at an expanding portion of the corresponding slot.

3. The five-phase motor according to claim 2, wherein the back yoke of the stator core extends from one coil end of the stator in the axial direction of the rotor, the five-phase motor further comprising a thermally conductive member filled between the one coil end and the extending back yoke.

4. The five-phase motor according to claim 1, further comprising:

a group Ru of windings through which a first-phase current Iu outputted from a three-phase inverter flows;

a group Rv of windings through which a second-phase current Iv outputted from the three-phase inverter flows; and a group Rw of windings through which a third-phase current Iw outputted from the three-phase inverter flows, wherein each phase winding of the five phase is comprised of a part of the winding groups Ru, Rv, and Rw.

* * * * *